United States Patent
Bommana et al.

(10) Patent No.: US 12,537,683 B2
(45) Date of Patent: Jan. 27, 2026

(54) FLOW-LEVEL DEDUPLICATION OF NETWORK TRAFFIC IN A NETWORK TRAFFIC VISIBILITY SYSTEM

(71) Applicant: Gigamon Inc., Santa Clara, CA (US)

(72) Inventors: Murali Bommana, Santa Clara, CA (US); Sandeep Dahiya, Santa Clara, CA (US); Santhosh Kumar, Chennai (IN)

(73) Assignee: Gigamon Inc., Santa Clara, CA (US)

( * ) Notice: Subject to any disclaimer, the term of this patent is extended or adjusted under 35 U.S.C. 154(b) by 85 days.

(21) Appl. No.: 18/441,400

(22) Filed: Feb. 14, 2024

(65) Prior Publication Data

US 2025/0260572 A1     Aug. 14, 2025

(51) Int. Cl.
*H04L 9/32*        (2006.01)
*H04L 9/40*        (2022.01)
*H04L 43/0876*     (2022.01)
*H04L 47/34*       (2022.01)

(52) U.S. Cl.
CPC ............ *H04L 9/32* (2013.01); *H04L 43/0876* (2013.01); *H04L 47/34* (2013.01); *H04L 63/0428* (2013.01)

(58) Field of Classification Search
CPC ... H04L 43/0876; H04L 43/026; H04L 43/04; H04L 43/20; H04L 63/0428; H04L 63/166; H04L 63/1408; H04L 47/34; H04L 9/32; H04L 41/40
USPC .......................................................... 726/26
See application file for complete search history.

(56) References Cited

U.S. PATENT DOCUMENTS

| 7,921,283 | B2* | 4/2011 | Hayes | H04L 9/321 713/157 |
| 8,448,234 | B2* | 5/2013 | Mondaeev | H04L 63/20 726/13 |
| 8,745,372 | B2* | 6/2014 | Orsini | H04L 12/4641 713/168 |
| 9,992,223 | B2* | 6/2018 | Ambati | H04L 63/1466 |

(Continued)

FOREIGN PATENT DOCUMENTS

EP     4016953 A1     6/2022

OTHER PUBLICATIONS

Extended European Search Report for European Application No. 25157841, mailed Jul. 2, 2025, 9 Pages.

*Primary Examiner* — Amare F Tabor

(74) *Attorney, Agent, or Firm* — Van Hoven PC; Jordan Becker

(57) ABSTRACT

A system and method for flow-level deduplication of network traffic are disclosed. A network node receives a first plurality of packets from a first network endpoint. The first plurality of packets represent a flow of data being communicated between the first network endpoint and a second network endpoint. The network node further receives a second plurality of packets from the second network endpoint. The network node identifies a sequence identifier of each packet of the first and second pluralities of packets. The network node determines that the first and second pluralities of packets are all associated with the same flow, based on the sequence identifiers of the first and second pluralities of packets. In response to that determination, the network node deduplicates the flow by discarding the first plurality of packets or the second plurality of packets. The network node may be a traffic visibility node.

18 Claims, 12 Drawing Sheets

(56) References Cited

U.S. PATENT DOCUMENTS

2015/0236895 A1\* 8/2015 Kay ................... H04L 43/045
  709/224
2021/0083857 A1  3/2021 Bergeron
2022/0069995 A1\* 3/2022 Philipp ................. H04L 9/12

\* cited by examiner

FLOW-LEVEL DEDUPLICATION OF NETWORK TRAFFIC IN A NETWORK TRAFFIC VISIBILITY SYSTEM

TECHNICAL FIELD

At least one embodiment of the present disclosure pertains to techniques for providing deduplication of network data traffic, and more particularly, to a technique for providing flow-level deduplication of network data traffic in a network traffic visibility system.

BACKGROUND

Network communications traffic may be acquired at numerous entry points on a network by one or more devices called network traffic "visibility nodes" to provide extensive visibility of communications traffic flow and network security. These network traffic visibility nodes (or simply "visibility nodes" herein) may include physical devices, virtual devices, and Software Defined Networking (SDN)/Network Function Virtualization (NFV) environments, and may be collectively referred to as the computer network's "visibility fabric." Various kinds of network tools are commonly coupled to such visibility nodes and used to identify, analyze, and/or handle security threats to the computer network, bottlenecks in the computer network, etc. Examples of such tools include an intrusion detection system (IDS), an intrusion prevention system (IPS), a network monitoring system, and an application monitoring system. The network visibility nodes are typically used to route network traffic (e.g., packets) to and from one or more connected network tools for these purposes. Examples of network visibility nodes suitable for these purposes include any of the GigaVUE® series of visibility appliances available from Gigamon® Inc. of Santa Clara, California. A network visibility node can be a physical device or system, or it can be a virtual device that is hosted by a physical device or system. A network visibility node commonly applies one or more policies to acquire and monitor traffic communicated in the target network.

Encryption is often used to protect sensitive data communicated on computer networks. For example, encryption applications may encrypt data sent between servers and clients. However, the use of encryption may limit the capabilities of security tools that require data in clear text.

BRIEF DESCRIPTION OF THE DRAWINGS

Various features of the technology will become apparent to those skilled in the art from a study of the Detailed Description in conjunction with the drawings. Embodiments of the technology are illustrated by way of example and not limitation in the drawings, in which like references may indicate similar elements.

DETAILED DESCRIPTION

Figure 1A:
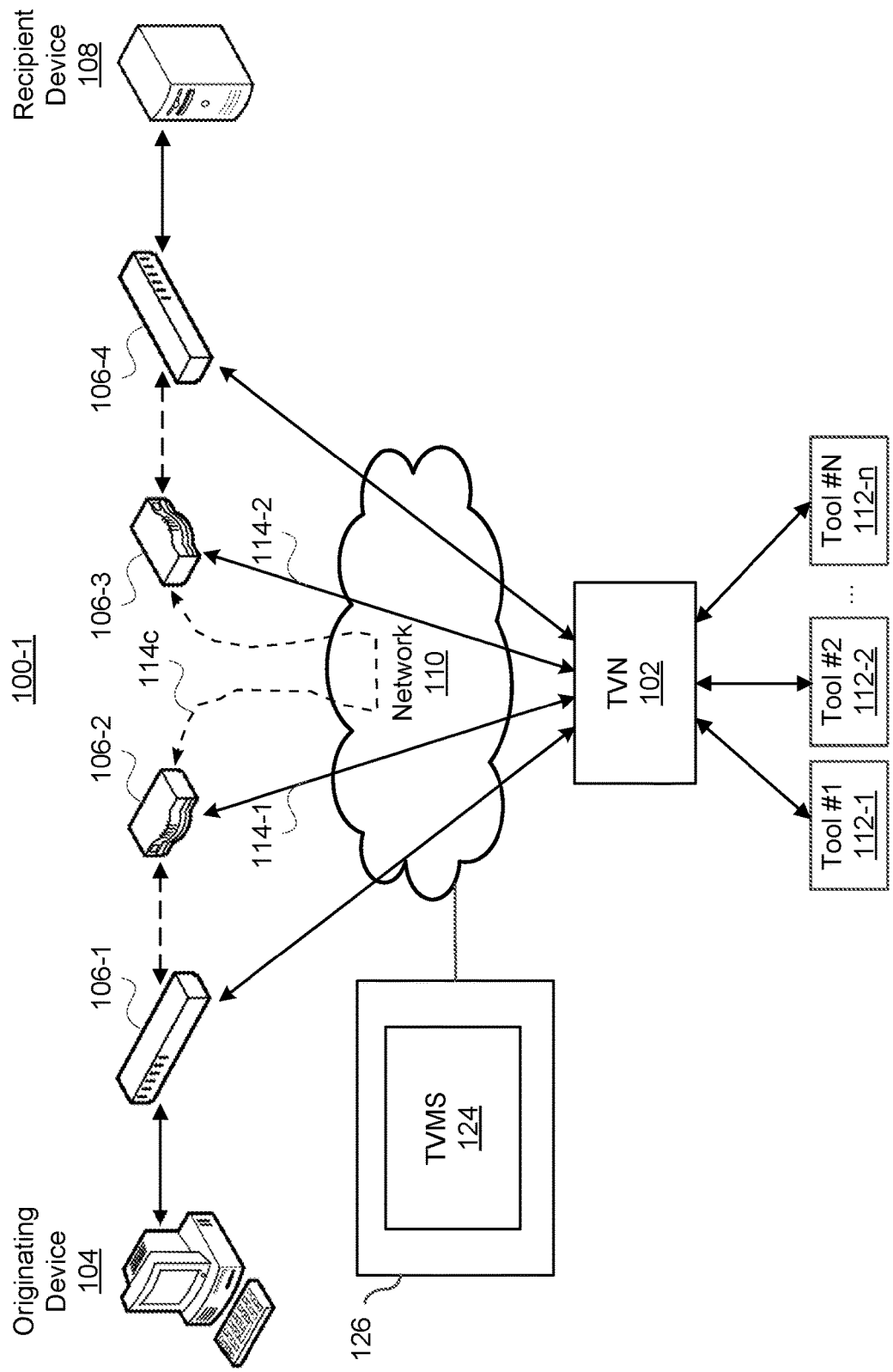
FIG. 1A depicts an example of a network arrangement in which a network visibility node receives data packets from nodes in a computer network.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Encryption techniques and protocols, such as secure sockets layer (SSL) for example, may be used to protect sensitive data communicated on computer networks. For example, encryption applications may encrypt data sent between servers and clients. However, the use of encryption may limit the capabilities of a traffic visibility fabric, security tools and/or other devices that require data in clear text. One possible solution is to use a keys-based approach, where SSL/TLS keys need to be captured and used to decrypt the traffic. A device needs to have the appropriate keys to decrypt the encrypted traffic. But providing and managing keys are a significant challenge in such a solution. That approach uses software to keep track of which session keys should be applied to which packets for decryption, which significantly increases processing overhead. In addition, that approach can complicate session renegotiation.

Introduced here, therefore, is a technique for providing clear text representing monitored data that is encrypted or about to be encrypted, from a worker node to another entity, such as a traffic visibility node (TVN) or a tool connected to a TVN, which expects to receive the data as clear text. The technique avoids the need for resource intensive key management for purposes of providing visibility for encrypted network traffic. To facilitate description, this technique is referred to herein as encryption-compatible visibility (ECV). The term "encryption/decryption" as used herein means either encryption or decryption, whichever is applicable depending on the context.

The ECV technique in at least some embodiments involves placing software hooks at the entry and/or exit points of library-based encryption/decryption functions in each of one or more worker nodes. The software hooks enable detection of library calls to local encryption/decryption functions and further enable local capture of clear text payloads of encrypted packets or packets that are to be encrypted. The worker nodes can be, but are not necessarily, worker nodes in a containerized environment, such as a Kubernetes environment, as described further below.

Placing software hooks at the entry and/or exit points of the local encryption/decryption functions to enable capture of clear text packet data eliminates the need for complex key management for purposes of providing traffic visibility functions. This technique, therefore, significantly reduces processing overhead associated with providing traffic visibility in a system that uses encryption. Furthermore, it does so without the need for a separate proxy application.

In at least some embodiments, the ECV technique is implemented, at least in part, by providing a separate ECV host associated with, and local to, each worker node to which ECV is to be applied. Using a software hook, the ECV host detects a call to an encryption/decryption function implemented in its associated worker node. The call can be a call to an encryption function in the worker node, for triggering encryption of a packet generated by a workload application in the worker node, for transmission to another node. Alternatively, the call can be a call to a decryption function in the worker node, for triggering decryption of an encrypted packet received by the worker node and destined for the workload application. The encryption/decryption function can be, for example, an SSL_Read function or an SSL_Write function in a secure sockets layer (SSL) library, such as an OpenSSL library. The workload application can be, for example, a transport layer security (TLS) application.

In response to detecting the call, the ECV host captures, via the same or another software hook, a clear text payload of the packet from an entry or exit point of the encryption/decryption function, whichever is applicable. The ECV host then creates a modified packet based on the captured clear text payload of the packet. Creating the modified packet includes synthesizing one or more headers for the modified packet, such as L2, L3 and L4 headers, and appending the headers to the clear text payload. The ECV host then sends the modified packet to one or more other processing entities external to the worker node, such as one or more TVNs and/or a network visibility tools. The modified packet may be sent by the ECV host securely to the other processing entity or entities via a tunneling protocol, for example, which may (but does not necessarily) implement a secure tunnel.

A human user (e.g., a visibility fabric administrator) can select the services to which ECV is to be applied, via a separate traffic visibility management system (TVMS). The TVMS provides a suitable user interface to allow the user to configure and supervise various traffic visibility operations. The TVMS also ascertains which workload application(s) in the monitored environment provide the selected services and which worker node(s) implement those workload applications, and then provides an indication of the relevant workload applications to the ECV host associated with each of those worker nodes.

The ECV host or hosts that receive this indication from the TVMS use that indication to identify the encryption/decryption library or libraries used by their relevant workload applications, and in response, they place software hooks on those encryption/decryption functions. The user may also be enabled to specify whether ECV is to be applied to: 1) encrypted packets that are to be decrypted (e.g., encrypted packets received by a worker node from another worker node), 2) unencrypted packets that are to be encrypted (e.g., packets generated by a workload application in the worker node), or both. These selections are also signaled by the TVMS to the appropriate ECV host or hosts, to enable the appropriate ECV host or other entity to place the software hooks at the appropriate points in the relevant encryption/decryption library or libraries.

The ECV technique can handle multiple simultaneous connections. Hence, the ECV host can, for each of a multiple packets associated with a multiple connections, identify contextual metadata for the packet, use the contextual metadata to identify a connection with which the packet is associated, and include additional metadata in at least one of the synthesized headers to indicate the connection with which the packet is associated. The contextual metadata may include, for example, a packet sequence number, and five-tuple details (i.e., source IP address, destination IP address, source port number, destination port number, and protocol).

Additionally, because the ECV host has access to both the encrypted complete packets and the corresponding clear text packet payloads, and contextual metadata relating to those, the ECV host can be configured to correlate the captured clear text payload with its corresponding encrypted full packet data and send all the correlated data to the TVN and/or other processing entities.

The ECV host can also use contextual metadata to translate cluster-internal IP addresses (i.e., IP addresses that are only relevant within the cluster) into global IP addresses understood by the TVN, tools and/or other processing entities that are external to the cluster. Additional details of the ECV technique will be apparent from the description that follows.

An incidental effect of the ECV technique, in at least some embodiments, is to cause two copies of each data flow to be received by the TVN whenever the worker node is communicating encrypted packets with another node. One copy of the flow will be provided to the TVN from the worker node and another copy of the same flow will be provided to the TVN from the other node with which the worker node is communicating. This can result in doubling the workload of the TVN if the two copies of the flow are not deduplicated. Introduced here, therefore, is a technique for flow deduplication at the TVN, as described further below. Notably, the deduplication is performed at the flow level, and not at the packet level.

General System Overview

In some embodiments, the ECV technique may be implemented in a containerized environment. Containerization is a form of virtualization in which the components of an application are bundled into a single container image and can be run in isolated user space on the same shared operating system. Containerization is increasingly being used to deploy software in cloud environments. Advantages of containerization are that it provides portability, scalability, fault tolerance and agility. An example of a popular system for providing containerization is the open source Kubernetes container orchestration system for automating software deployment, scaling, and management.

Before further considering the ECV technique in a containerized environment, it is useful first to consider how traffic visibility can be employed in a non-containerized environment. FIG. 1A shows an example of a non-containerized network arrangement 100-1 in which a network traffic visibility node (TVN) 102 receives data packets from multiple devices and/or applications (collectively referred to as "nodes") in a computer network 110. The nodes (e.g., switches 106-1, 106-4 and routers 106-2, 106-3) couple an originating device 104 (e.g., desktop computer system operating as a client) to a destination device 108 (e.g., server) and allow data packets to be transmitted between the originating device 104 and the destination device 108. Examples of nodes include switches, routers, and network taps.

Each node represents an entry point into the computer network 110. The entry points, however, could be, and often are, from different points within the computer network 110. Generally, at least some of the nodes are operable to transmit data packets received as network traffic (or duplicate copies of the data packets) to a TVN 102 for analysis. Thus, network traffic is directed to TVN 102 by a node that provides an entry point into the computer network 110.

Whether a node transmits the original data packets or copies of the data packets to a device downstream of the node (e.g., the TVN 102) depends on whether the downstream device is an inline device or an out-of-band or "tapped mode" device (i.e., where a copy of each packet is provided to the TVN 102 by a network tap. As noted above, inline devices receive the original data packets, while out-of-band devices receive copies of original data packets.

Here, for example, the TVN 102 can receive original data packets from node 106-2 (e.g., via transmission path 114-1) and pass at least some of the original data packets to node 106-3 (e.g., via transmission path 114-2). Because node 106-2 is able to transmit network traffic downstream through the TVN 102, node 106-2 need not be coupled directly to node 106-3 (i.e., transmission path 114c may not exist). Some or all of the nodes within the computer network can be configured in a similar fashion.

When the TVN 102 is deployed as an inline device, data packets are received by the network device at a physical network port of the network device. For example, data packets transmitted by node 106-2 via transmission path 114-1 are received by the TVN 102 at a particular network port. The network device may include multiple network ports coupled to different nodes in the computer network 110. The TVN 102 can be, for example, a physical monitoring platform that includes a chassis and interchangeable blades offering various functionalities, such as enhanced packet distribution and masking/filtering capabilities. Alternatively, TVN 102 can be implemented as a virtualized device that is hosted on a physical platform.

The TVN 102 can also include multiple physical tool ports coupled to different network tools 112-1 through 112-n. The TVN 102 and tools 112-1 through 112-n form at least a portion of a traffic visibility fabric. As further described below, each network tool 112-1 through 112-n can be deployed as an inline device or an out-of-band device at any given point in time. An administrator of the traffic visibility fabric may be able to switch the deployment mode of one or more of the network tools 112-1 through 112-n. That is, the administrator may be able to deploy an out-of-band network tool as an inline device and vice versa. When a network tool is deployed as an out-of-band device, the TVN 102 creates a duplicate copy of at least some of the data packets received by the TVN 102, and then passes the duplicate copies to a tool port for transmission downstream to the out-of-band network tool. When a network tool is deployed as an inline device, the network device passes at least some of the original data packets to a tool port for transmission downstream to the inline network tool, and those packets are then normally subsequently received back from the tool at a separate tool port of the network device, assuming the packets are not blocked by the tool.

Figure 1B:
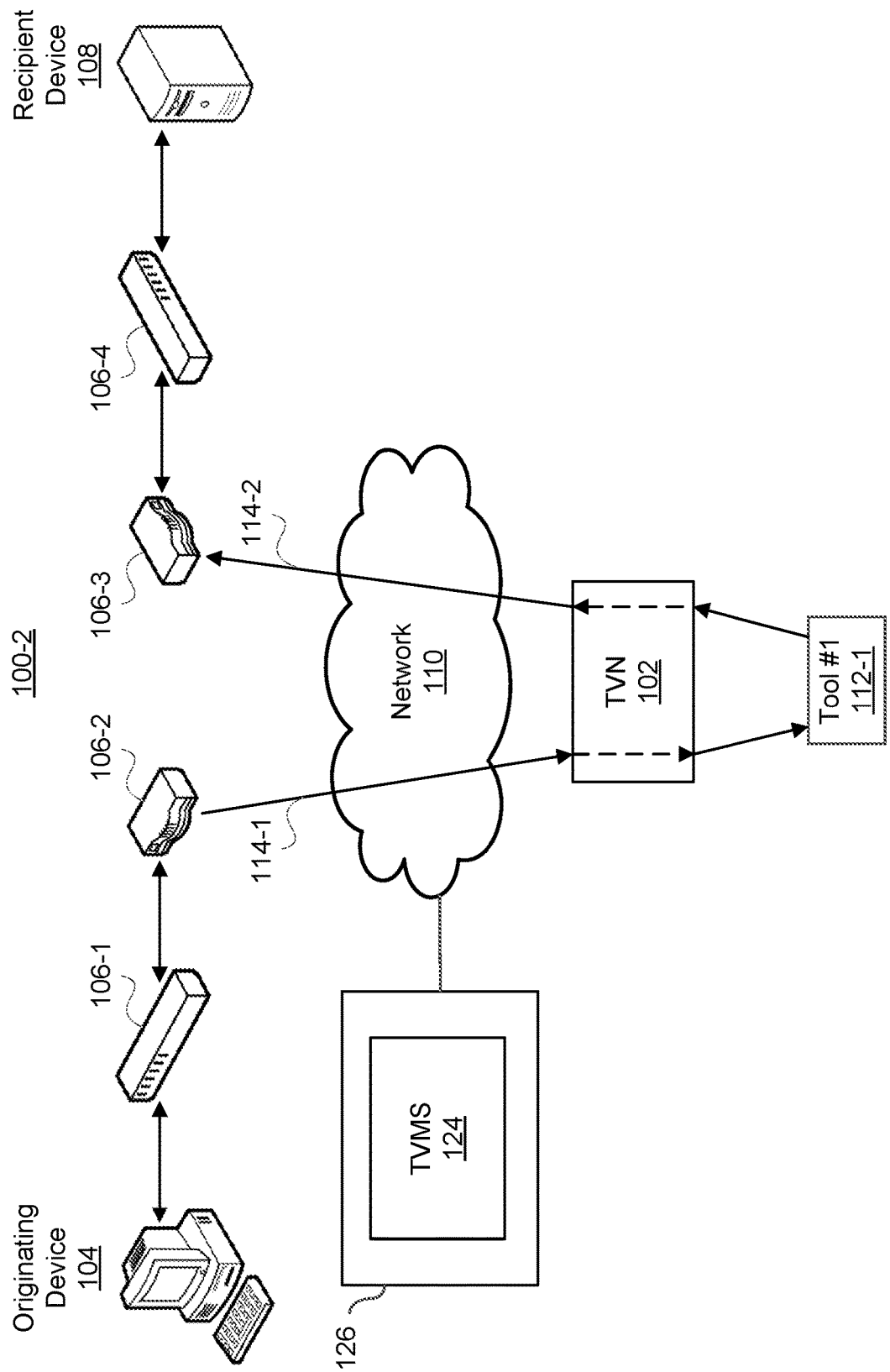
FIG. 1B depicts another example of a network arrangement in which a network visibility node receives data packets from a node in a computer network.

FIG. 1B illustrates an example path of a data packet as the data packet travels from an originating device 104 to a destination device 108. More specifically, FIG. 1B depicts a network arrangement 100-2 in which the TVN 102 and a network tool 112-1 are both deployed as inline devices (i.e., within the flow of network traffic).

Upon receiving a data packet from node 106-2, the TVN 102 identifies a flow map corresponding to the data packet based on one or more characteristics of the data packet. For example, the characteristic(s) could include the communication protocol of which the data packet is a part (e.g., HTTP, TCP, IP) or a session feature (e.g., a timestamp). Additionally or alternatively, the appropriate flow map could be identified based on the network port (of the network device) on which the data packet was received, or the source node from which the data packet was received.

A flow map represents a policy for how the data packet is to be handled by the TVN 102. For example, the flow map could indicate that the data packet is to be aggregated with another data packet, filtered, sampled, modified (e.g., stripped of a header or payload), or forwarded to one or more tool ports. Moreover, the flow map could specify that the data packet is to be transmitted in a one-to-one configuration (i.e., from a network port of the TVN 102 to a tool port of the TVN 102) or one-to-many configuration (i.e., from a network port of the TVN 102 to multiple tool ports of the TVN 102). Similarly, a single tool port of the TVN 102 could receive data packets from one or more network ports of the TVN 102.

Often the data packet is passed by the TVN 102 to a tool port of the TVN 102 for transmission downstream to a network tool (e.g., a monitoring and/or security-related tool). Here, for example, the flow map may specify that the data packet is to be passed by the TVN 102 to a tool port for transmission downstream to tool 112-1. The network device may aggregate or modify the data packet in accordance with the policy specified by the flow map before passing the data packet to a tool port for transmission downstream to the network tool 112-1. In some embodiments, the TVN 102 includes multiple tool ports, each of which is coupled to a different network tool.

After analyzing the data packet, the tool 112-1 may transmit the data packet back to the TVN 102 (i.e., assuming the tool 112-1 does not determine that the packet should be blocked), which passes the data packet to a network port for transmission downstream to another node (e.g., node 106-3).

FIGS. 1A and 1B also show how a TVN 102 can be connected via a network 110 (e.g., a local area network (LAN) or the Internet) to a traffic visibility management system (TVMS) 124 running on a separate computer system 126. The TVMS 124 provides a user interface that may be used by a user (e.g., a visibility fabric administrator) to configure the traffic visibility fabric (e.g., TVN 102), including creating and editing traffic monitoring policies. The TVMS 124 also generates traffic visibility summary and statistical reports and outputs them to the user.

Figure 2:
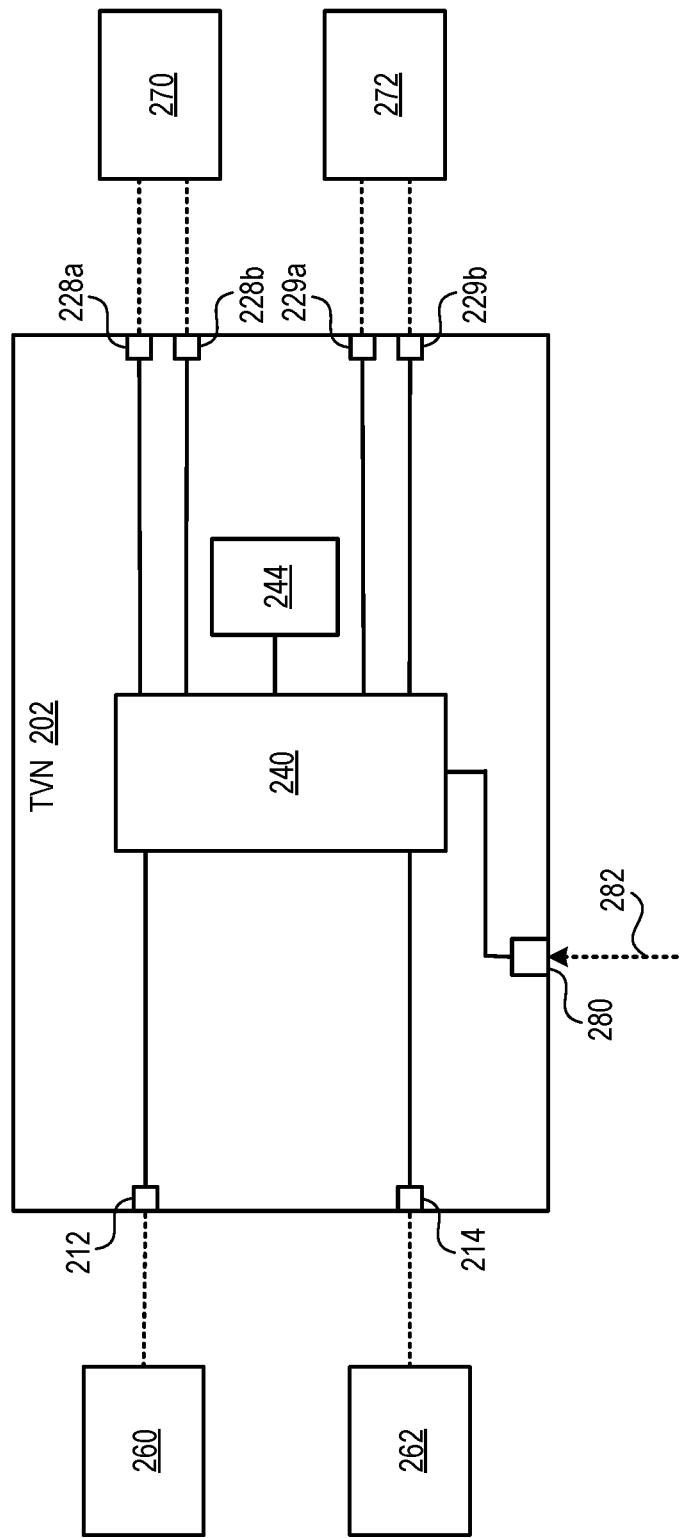
FIG. 2 is a block diagram showing an example of a network visibility node.

FIG. 2 is a block diagram showing an example of a TVN 202 that can be used as part of a traffic visibility fabric in either a containerized environment or (as shown in FIGS. 1A and 1B) in a non-containerized environment. TVN 202 can be representative of TVN 102 in FIGS. 1A and 1B. The example TVN 202 includes two network ports 212 and 214, a first pair of tool ports including an egress tool port 228a and an ingress tool port 228b, and a second pair of tool ports including an egress port 229a and an ingress port 229b. Although only two network ports 212, 214 are shown in FIG. 2, in other embodiments the TVN 202 may include more than two network ports. Also, although two tool ports 228, 229 are shown, in other embodiments, the TVN 202 may include only one tool port, or more than two tool ports.

Packets received by the TVN 202 are sent through tool egress port 228*a* to tool 270, which after processing those packets returns them to the TVN 202 through tool ingress port 228*b*. Similarly, packets received by the TVN 202 are sent through tool egress port 229*a* to tool 272, which after processing those packets returns them to the TVN 202 through tool ingress port 229*b*. In other embodiments the TVN 202 may contain more or fewer tool ports than four, and in operation, it may be coupled to more or fewer tools than two.

The TVN 202 also includes a packet switch ("switch module") 240 that implements selective coupling between network ports 212, 214 and tool ports 228, 229. As used in this specification, the term "tool port" refers to any port that is configured to transmit packets to or receive packets from an external tool. The TVN 202 further includes a processor 244, and may include a housing for containing the packet switch 240 and the processor 244. In other embodiments the TVN 202 may not have its own housing and may be implemented as a virtualized device. The processor 244 may be, for example, a general-purpose programmable microprocessor (which may include multiple cores), an application specific integrated circuit (ASIC) processor, a field programmable gate array (FPGA), or other convenient type of circuitry.

The TVN 202 may also include other components not shown, such as one or more network physical layers ("PHYs") coupled to each of the respective ports 212, 214, wherein the network PHYs may be parts of the packet switch 240. Alternatively, the network PHYs may be components that are separate from the packet switch 240. The PHY is configured to connect a link layer device to a physical medium such as an optical fiber, copper cable, etc. In other embodiments, instead of the PHY, the TVN 202 may include an optical transceiver, or a Serializer/Deserializer (SerDes), etc.

During operation of the TVN 202, the first network port 212 of the TVN 202 is communicatively coupled (e.g., via a network, such as a LAN or the Internet) to a first node 260, and the second network port 214 is communicatively coupled (e.g., via a network, such as a LAN or the Internet) to a second node 262. The TVN 202 is configured to communicate packets between the first and second nodes 260, 262 via the network ports 212, 214. Also, during operation, the tool ports 228, 229 of the TVN 202 are communicatively coupled to respective tools 270, 272. The tools 270, 272 may include, for example, one or more of an IDS, IPS, packet sniffer, monitoring system, etc. The tools 270, 272 may be directly coupled to the TVN 202, or communicatively coupled to the TVN 202 through the network (e.g., the Internet). In some cases, the TVN 202 is a single unit that can be deployed at a single point along a communication path.

In the illustrated embodiments, the packet switch 240 is configured to receive packets from nodes 260, 262 via the network ports 212, 214, and process the packets in accordance with a predefined scheme. For example, the packet switch 240 may pass packets received from one or more nodes to one or more tools 270, 272 that are connected to respective tool port(s) 228, 229, respectively.

The packet switch 240 may be any type of switch module that provides packet transmission in accordance with a predetermined transmission scheme (e.g., a policy). In some embodiments, the packet switch 240 may be user-configurable such that packets may be transmitted in a one-to-one configuration (i.e., from one network port to an tool port). Each of tool 270 and tool 272 may be an out-of-band device (i.e., it can only receive packets intended to be communicated between two nodes, and cannot transmit such packets downstream), such as a sniffer, a network monitoring system, an application monitoring system, an IDS, a forensic storage system, an application security system, etc. Alternatively, each of tool 270 and tool 272 may be an in-line device (i.e., it can receive packets, and transmit the packets back to the TVN 202 after the packets have been processed), such as an IPS. In other embodiments, the packet switch 240 may be configured such that the packets may be transmitted in a one-to-many configuration (i.e., from one network port to multiple tool ports). In other embodiments, the packet switch 240 may be configured such that the packets may be transmitted in a many-to-many configuration (i.e., from multiple network ports to multiple tool ports). In further embodiments, the packet switch 240 may be configured such that the packets may be transmitted in a many-to-one configuration (i.e., from multiple network ports to one tool port). In some embodiments, the one-to-one, one-to-many, many-to-many, and many-to-one configurations are all available for allowing a user to selectively configure the TVN 202 so that received packets (or certain types of received packets) are routed according to any of these configurations. In some embodiments, the packet movement configuration is predetermined such that when the TVN 202 receives the packets, the TVN 202 will automatically forward the packets to the ports based on the predetermined packet movement configuration (e.g., one-to-one, one-to-many, many-to-many, and many-to-one) without the need to analyze the packets (e.g., without the need to examine the header, determine the type of packets, etc.).

Examples of a TVN that may implement features and functions described herein include any of the GigaVUE® series of network visibility appliances available from Gigamon® Inc. of Santa Clara, California. An example of a virtualized TVN for a cloud environment is a GigaVUE V Series device from Gigamon Inc.

Containerized Environment

In a containerized environment, each container includes software code that provides one or more services. In a Kubernetes deployment, for example, each container is included in a "pod," and each pod can include multiple containers. Each pod is included within a worker node, and there may be multiple worker nodes in a given containerized deployment. Further, each worker node can contain multiple pods.

Figure 4:
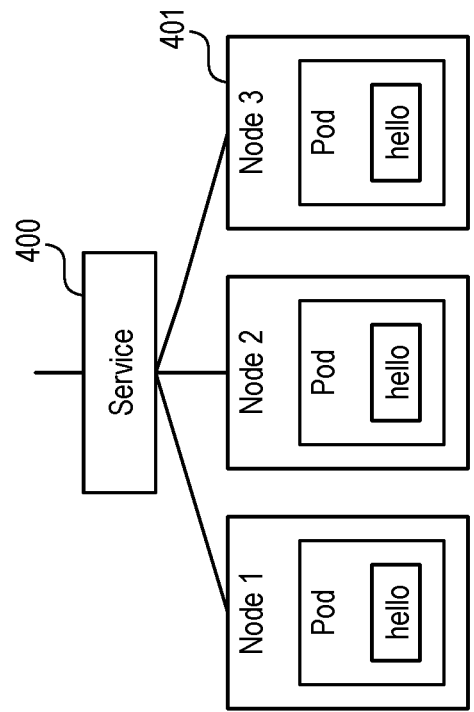
FIG. 4 shows an example of the relationship between services, nodes and pods in a Kubernetes deployment.
Figure 3:
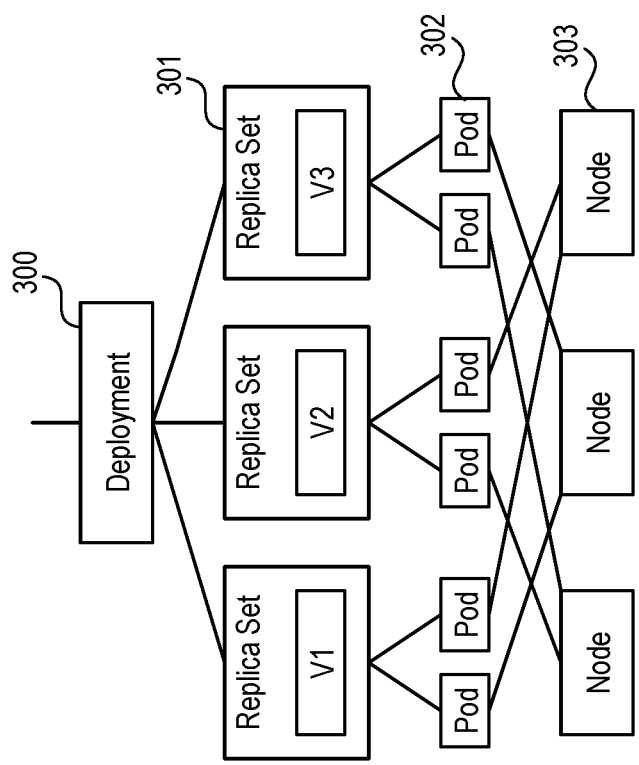
FIG. 3 shows an example of a Kubernetes deployment.

FIG. 3 shows an example of a Kubernetes deployment. A given containerized deployment 300 may include multiple replica sets, i.e., multiple instances of a given type of pod as shown. Each replica set 301 can correspond to, for example, a different version (e.g., V1, V2, V3) of a software program, and can include multiple pods, where each pod 302 is included within a particular one of multiple nodes 303 in the deployment 300. FIG. 4 shows an example of the relationship between services, nodes and pods in a Kubernetes deployment. As shown, a particular service (named "hello") can be made available by running it as various Pods across multiple nodes, such as Node1, Node2 and Node3.

Figure 5:
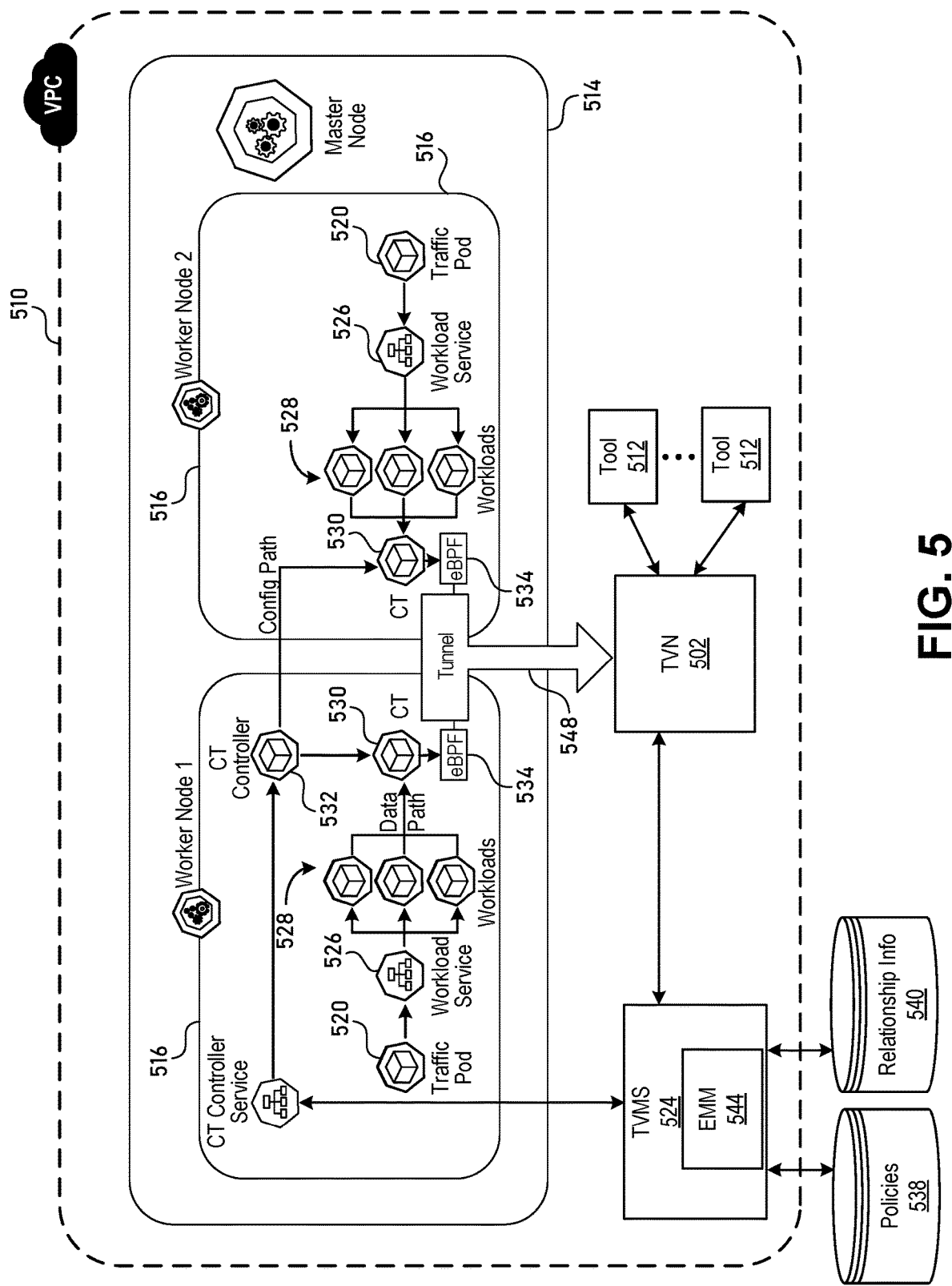
FIG. 5 illustrates an example of a containerized environment in which the dynamic adaptation of traffic monitoring policies can be performed.

FIG. 5 illustrates an example of a containerized environment in which the technique introduced here can be implemented. In at least one embodiment the technique, a traffic visibility fabric is integrated with the containerized environment, although in other embodiments that may not be the case. The traffic visibility fabric includes a TVMS 524, at least one TVN 502 and one or more tools 512 coupled to the TVN 502 in the manner described above. The TVN 502 may be a virtualized device. An example of a virtualized TVN that may be used in this environment is a GigaVUE V Series device from Gigamon Inc. Although only one TVN 502 is shown in FIG. 5, in some embodiments multiple TVNs 502 may be provided in a traffic visibility fabric, such as for load-balancing of traffic input to the visibility fabric.

To facilitate discussion, it is henceforth generally assumed herein that the containerized environment is a Kubernetes environment. However, it should be understood that the technique introduced here can be applied to, or can be easily modified to apply to, other types of containerized environments. Hence, the illustrated environment can be implemented in a virtual private cloud (VPC) 510. The environment includes a master node 514 and two or more worker nodes 516. Each worker node 516 includes at least one traffic pod 520 that generates data traffic in providing one or more workload services 526, which each generate one or more workloads 528.

Any particular worker node 516 may include a different type or types of traffic pod 520 than any other particular worker node, and therefore may provide different types of workload services 526 from any other worker node. Conversely, any particular type of traffic pod 520 may also be replicated across two or more of the worker nodes 516, such that two or more worker nodes 516 may provide the same or overlapping workload services 526.

The traffic visibility fabric in FIG. 5 also includes a containerized tap (CT) 530 within each worker node 516 that is to be monitored for traffic visibility. A CT 530 is a containerized utility component that automatically deploys as a pod within each worker node in the containerized environment, and sends traffic to one or more TVNs 502. A CT 530, in at least some embodiments, can perform traffic acquisition, aggregation, basic filtering, replication, and tunneling support. In other words, a CT 530 is a container or pod, within or associated with a given worker node 516, that actually implements the traffic monitoring polices deployed by the TVMS 524 for that worker node.

In the illustrated embodiment, at least one of the worker nodes 516 also includes a CT controller 532. Each CT 530 is registered with the TVMS 524 through the CT controller 532. The TVMS 524 deploys traffic monitoring policies and configuration data onto each CT 530 via the CT controller 532. The CT controller 532 collects statistics on filtered network traffic from each CT 530 and sends the collected statistics and heartbeats to the TVMS 524. Additionally, the CT controller 532 performs environment inventory collection, and provides the information collected from this process to the TVMS 524.

Data traffic filtered (tapped) by a CT 530 is sent via a tunnel 548 (e.g., a L2GRE or VxLAN tunnel) to the appropriate TVN 502. In at least some embodiments, as illustrated, an extended Berkeley packet filter (eBPF) hook 534 is installed in each worker node 516 and is used by its local CT 530 to implement the tunnel 548 between the CT 530 and the TVN 502. The CT 530 configures a data path in kernel space using the eBPF 534. The workloads 528 collect the network traffic and send the network packets to the kernel space. The kernel space filters (taps) the packets based on the policy rules and filters. The filtered (tapped) network packets can be tunneled directly to the specified tool(s) 512, or they can be sent to the specified tool(s) 512 through the specified TVN(s) 502. The TVN(s) 502 in this embodiment may be one or more virtualized devices running in the cloud environment.

The TVMS 524 may maintain various traffic monitoring policies 538 that include, for example, rules for traffic tapping and filtering, and for tunneling tapped data traffic to the TVN 502. Additionally, the TVMS 524 may maintain detailed relationship information 540 about the physical and logical configuration of the containerized environment, and any changes that occur to the containerized environment, such as information on all nodes, namespaces, services, deployments, pod names, container identifiers (IDs), Internet protocol (IP) addresses and labels used in the environment. In at least some embodiments, the TVMS 524 stores this relationship information 540 in in-memory data structures, which are designed so that once they are populated, the relationships between various resources in the environment can be easily ascertained by the TVMS 524 from the data structures. For example, a service may front-end a set of pods, as illustrated in FIG. 4. Similarly, a deployment may have a set of replicas, i.e., multiple instances of a given type of pod.

Traffic monitoring policies 538 can be defined by a user (e.g., a visibility fabric administrator) through a user interface of the TVMS 524. For example, in addition to traffic source selection, a user can specify rules specifying direction of traffic (e.g., ingress, egress or bidirectional), priority, action (e.g., pass packet, drop packet, push to user space for advanced processing), filters (e.g., L2, L3, L4, metadata, process name), and tunneling (e.g., destination information and type of tunnel encapsulation, such as VXLAN or GRE). An example of a traffic monitoring policy is to tap traffic from a discovered service that has three pods, and filter that traffic to allow only traffic to destination TCP port 80.

Encryption-Compatible Visibility (ECV)

As mentioned above, ECV is a technique introduced here, for providing clear text representing monitored data that is encrypted or about to be encrypted, from a worker node to one or more other entities, such as one or more TVNs and/or tools, that expect to receive the data as clear text. The monitored data may be, for example, data that is being transmitted from the worker node to another network node, or data that is being received by the worker node from another network node. The ECV technique avoids the need for resource intensive key management for purposes of providing visibility for encrypted network traffic. In the embodiment of FIG. 5, by using the user interface of TVMS 524, the user can specify where ECV is to be applied in the containerized environment. In other words, the user can specify, for example, which encrypted data traffic is to be converted to clear text and provided to the TVN 502 (for subsequent routing to one or more of the tools 512). For example, the user can specify one or more particular services whose traffic is to be converted to clear text and provided to the TVN 502. This information may be stored in policies database 538, for example.

Figure 6:
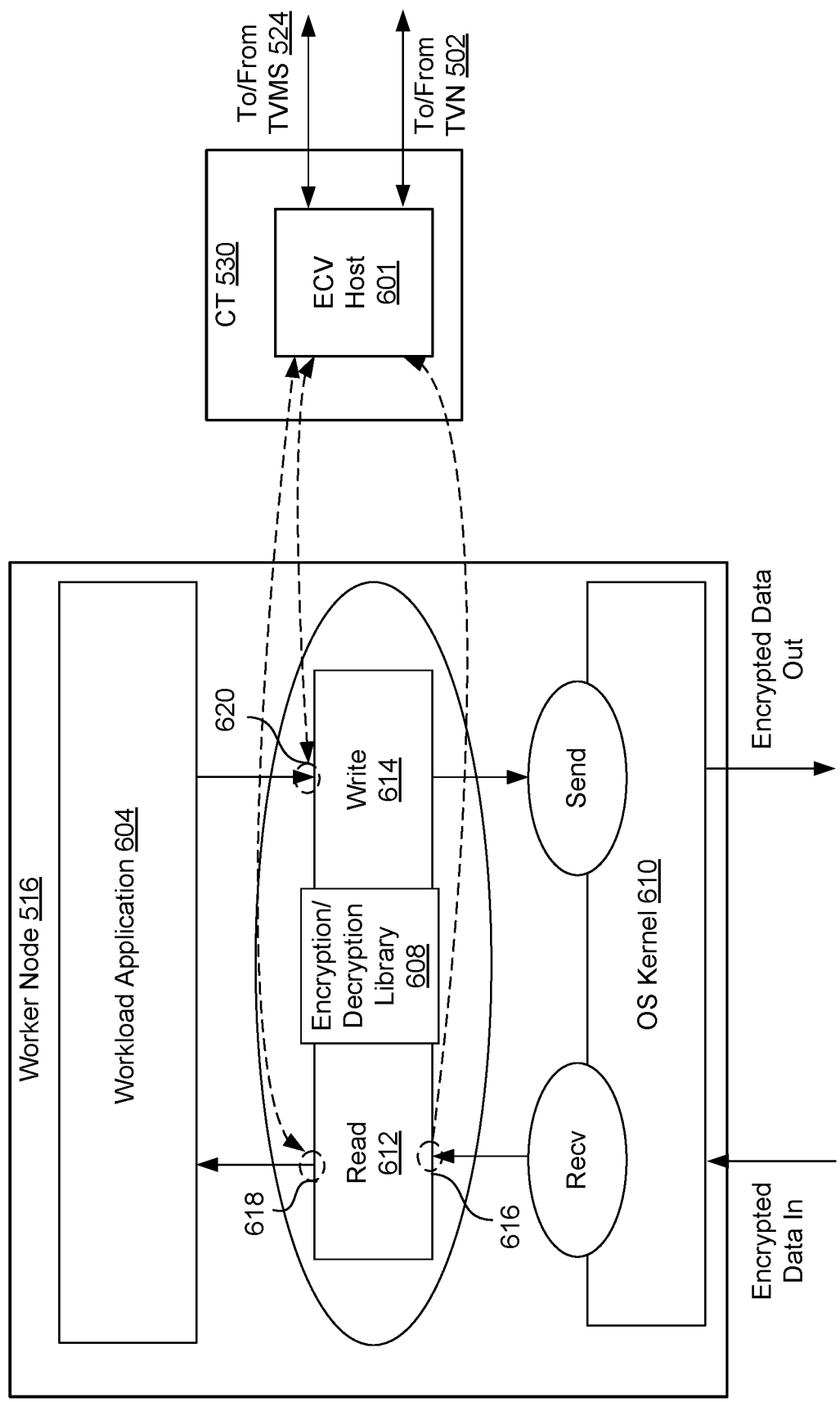
FIG. 6 schematically illustrates the components of, and functional relationships between, a worker node and a corresponding encryption-compatible visibility (ECV) host.

The TVMS 524 includes an ECV management module (EMM) 544 that uses the specified service(s) specified by the user to look up the corresponding workload application(s) that provide the service(s), and the worker node(s) in which the identified workload application(s) is/are implemented. In some embodiments, as shown in FIG. 6, each worker node 516 has a dedicated ECV host 601 associated with it. In response to the user's selection of services to which to apply ECV, the TVMS 524 sends a ECV request signal identifying the corresponding workload applications to the dedicated ECV host 601 associated with each worker node 516 that hosts an instance of the corresponding workload applications. In some embodiments, a workload application 604 may be a TLS-enabled application ("TLS application"). In some embodiments, a dedicated ECV host 601 may be instantiated for each worker node 516 upon initialization of the containerized environment. In other embodiments, the dedicated ECV host 601 may be instantiated for a given worker node dynamically during runtime, on an as needed basis, for example, when the TVMS 524 determines that ECV is needed at the given worker node.

Note that while the ECV technique is described herein in the context of a containerized environment for convenience, the ECV technique can also be implemented in a non-containerized environment. In a non-containerized embodiment, the worker node in FIG. 6 may be a virtual machine, for example.

In some embodiments, as shown in FIG. 6, each dedicated ECV host 601 may be included in the CT 530 associated with its worker node 516. To facilitate description of the ECV technique, this description henceforth is based on such an embodiment, except where stated otherwise. Note, however, that other embodiments are contemplated, in which the dedicated ECV host 601 may be implemented in another component, or as a standalone entity. In at least some embodiments, the EMM 544 and/or the dedicated ECV host 601 are each implemented as programmable circuitry, programmed by instructions to execute the functions described herein as being performed by these entities. Such programmable circuitry may include, for example, one or more conventional programmable general-purpose or special-purpose microprocessors and/or microcontrollers. In other embodiments, the EMM 544 and/or the dedicated ECV host 601 each may be implemented using preconfigured or hardwired circuitry, such as one or more application specific integrated circuits (ASICs), programmable logic devices (PLD), or the like. In still other embodiments, the dedicated ECV host 601 may be implemented using a combination of programmable circuitry and hardwired circuitry.

Referring to FIG. 6, ECV may be requested for encrypted data received by the worker node 516 (i.e., "Encrypted Data In") from another network node, for processing by the workload application. Receipt of an ECV service request may be signaled to the ECV host 601 by the EMM 544. In that case, and assuming SSL is the relevant encryption/decryption protocol, the ECV host 601 responds by applying software hooks to the entry point 616 and exit point 618 of the Read function 612 in the encryption library 608 of the worker node 516. The Read function 612 may be, for example, an SSL_Read function, and the encryption/decryption library 608 may be, for example, an OpenSSL library, as henceforth assumed herein for the sake of facilitating description. The software hooks may be, for example, eBPF trace point hooks, and more specifically, eBPF uprobe hooks. The software hook can be implemented in code that is part of the eBPF kernel 622, which can be loaded into the OS kernel 610 by the ECV host 601. The software hook applied to the entry point 616 of the Read function 612 detects a call by the operating system (OS) kernel 610 to the Read function 612 in response to receipt of each encrypted packet by the worker node from outside the worker node (the OS kernel 610 can be, for example, a Linux kernel). This call is used to trigger capture of the packet payload in clear text at the exit point 618 of the Read function. In response to that trigger, the software hook on the exit point 618 of the Read function actually captures the packet payload in clear text and provides it to the ECV host 601. In at least some embodiments, eBPF maps are used to pass the clear text payload data from the OS kernel space to user space when the software hook is hit.

ECV may additionally or alternatively be applied to data that is generated by the workload application for transmission in encrypted form by the worker node to another node. That event is signaled to the ECV host 601 by the TVMS 524. In that case, the ECV host 601 responds by applying a software hook to the entry point 620 of the Write function 614 in the encryption/decryption library 608 of the worker node 516. The write function 614 may be, for example, an SSL_Write function, as henceforth assumed herein for the sake of facilitating description. This software hook detects a call to the Write function by the workload application 604 when the workload application 604 passes a clear text packet payload to the Write function. This call is used both to trigger the capture and to perform the capture of the clear text payload of each unencrypted packet generated by the workload application directly from the entry point 620 of the Write function, before the packet payload is encrypted by the SSL library. In at least one embodiment, the hook is also an eBPF uprobe hook. Another software hook (which can also be an eBPF uprobe hook, for example) can be placed at the exit point of the Write function to enable the ECV host 601 to ascertain the actual amount of data that was written via the SSL_write.

Whenever the ECV host 601 receives a clear text packet payload from its associated worker node 516 in the above-described situations (e.g., via the above-mentioned hooks), it places the clear text packet payload into a buffer. In some embodiments the buffer is an eBPF perf buffer. The ECV host 601 then forms a modified packet by synthesizing the L2, L3 and L4 headers for the packet payload and appending the synthesized headers to the clear text packet payload. To synthesize the headers, in some embodiments, whenever SSL_accept/SSL_connect is invoked by the workload application 604, an SSL_HELLO message will be triggered. This message can be captured using an eBPF kprobe hook placed against the function, tcp_sendmsg (a Linux kernel API). L3 and L4 header information is then fetched via this hook by accessing the socket structures at the kprobe level. For L2 header information, the source MAC address can be fetched for all of the interfaces at the time of adding the uprobes and stored, and then can be used as L2 Source MAC address while framing the TCP/IP frame. The MAC address of the default gateway can be used as the L2 Destination MAC address.

After synthesizing the headers, the ECV host 601 then sends the modified packet to one or more other devices, such as the TVN 502 and/or one or more associated tools 512. In some embodiments, the ECV host 601 sends the modified packet to the TVN 502 and/or tools 512 via the tunnel 548. In some embodiments in which that is the case, the tunnel 548 may be secure tunnel.

In at least some embodiments, the ECV host 601 can perform ECV for multiple simultaneous connections between the worker node 516 and two or more other devices, while properly mapping the four-tuple (source IP address, destination IP address, source port number, destination port number) or five-tuple information to respective SSL_Read and SSL_Write. The ECV host 601 keeps track of each session (five-tuple) for which it is performing ECV. This way, it can forward only the ECV-processed packets that need to be forwarded. The five-tuple details are stored by the ECV host 601 on a per connection basis, identified by the SSL object and the thread that invoked the connection. The saving of this contextual metadata makes handling simultaneous connections possible.

Figure 7:
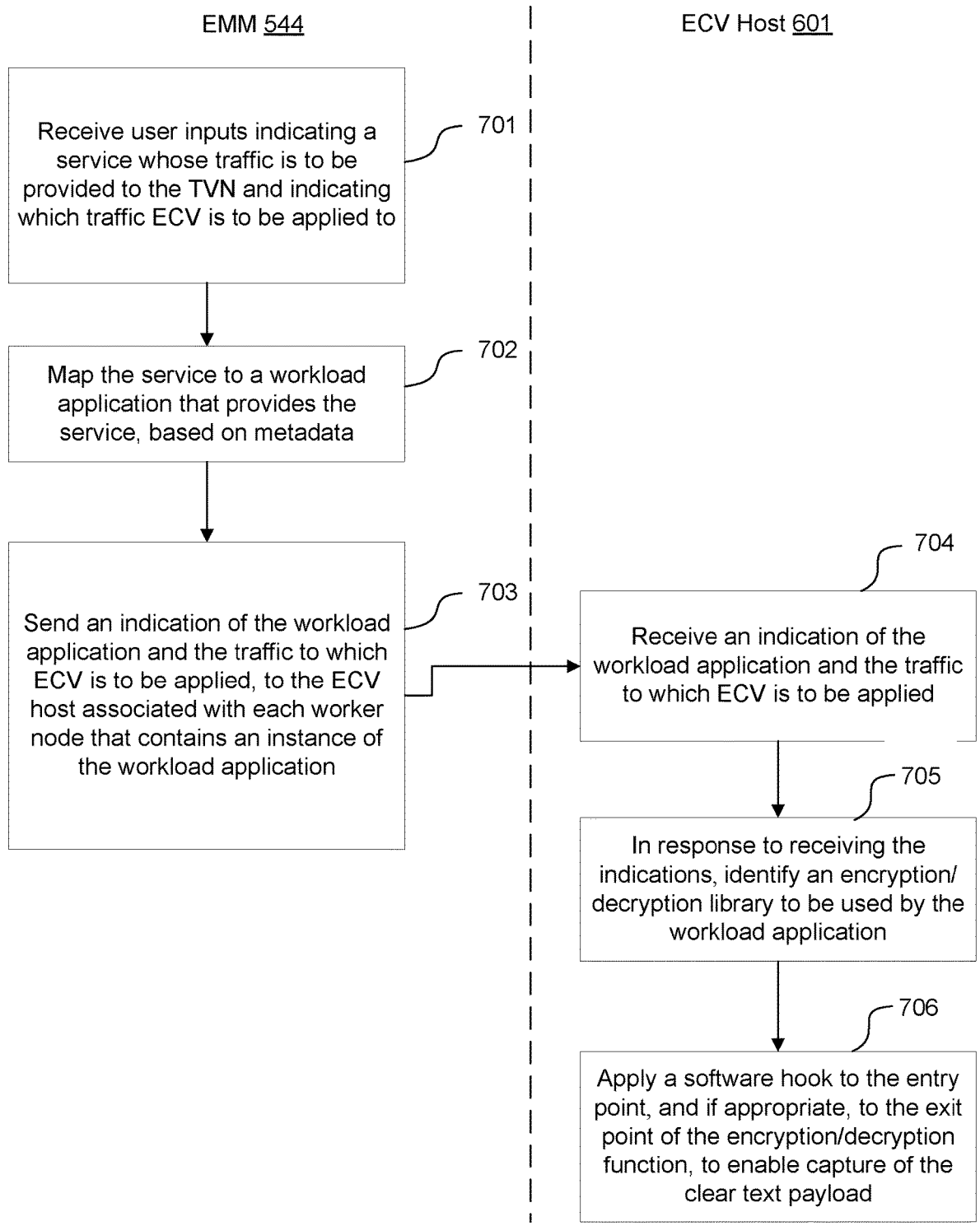
FIG. 7 is a flowchart illustrating an example of a process to configure the system to perform ECV.

FIG. 7 illustrates an example of a process to configure the system to perform ECV. In at least some embodiments the process is performed partly by the EMM 544 in the TVMS 524 and partly by one or more ECV hosts 601. At step 701 the EMM 544 receives user inputs indicating a service whose traffic is to be provided to the traffic visibility node and indicating which traffic ECV is to be applied to, i.e., received data, data to be transmitted, or both. In response to these user inputs, at step 702 the EMM 544 maps the service to a workload application that provides the service, based on metadata. For example, this step may use a portion of relationship data 540 (FIG. 5) to make this determination.

At step 703 the EMM 544 sends an indication of the workload application and the traffic to which ECV is to be applied, to the ECV host 601 associated with each worker node 516 that contains an instance of the relevant workload application.

Steps 704 through 706 may be performed by each such ECV host 601. At step 704 the ECV host 601 receives these above-mentioned indications. In response to receiving the indications, the ECV host 601 at step 705 identifies an encryption/decryption library to be used by the workload application (e.g., an SSL library), wherein the encryption/decryption library includes the encryption/decryption functionality to be applied to received or generated packets associated with the workload application. At step 706 the ECV host 601 applies a software hook to the entry point, and if appropriate, to the exit point of the encryption/decryption function, to enable capture of the clear text payload. To apply ECV to data received by the worker node, a first software hook is applied to the exit point of the decryption function to capture the clear text data, and a second software hook is applied to the entry point of the decryption function to trigger this action when a packet is received. The encrypted version of the packet can be captured by placing a third hook at the level of the virtual network interface in the worker node for the user pod, to enable the encrypted data and corresponding clear text data to be sent to the TVN 502 or other devices in a correlated manner. On the other hand, to apply ECV to data to be generated by the worker node, a software hook at the entry point of the encryption function captures the clear text data.

Figure 8:
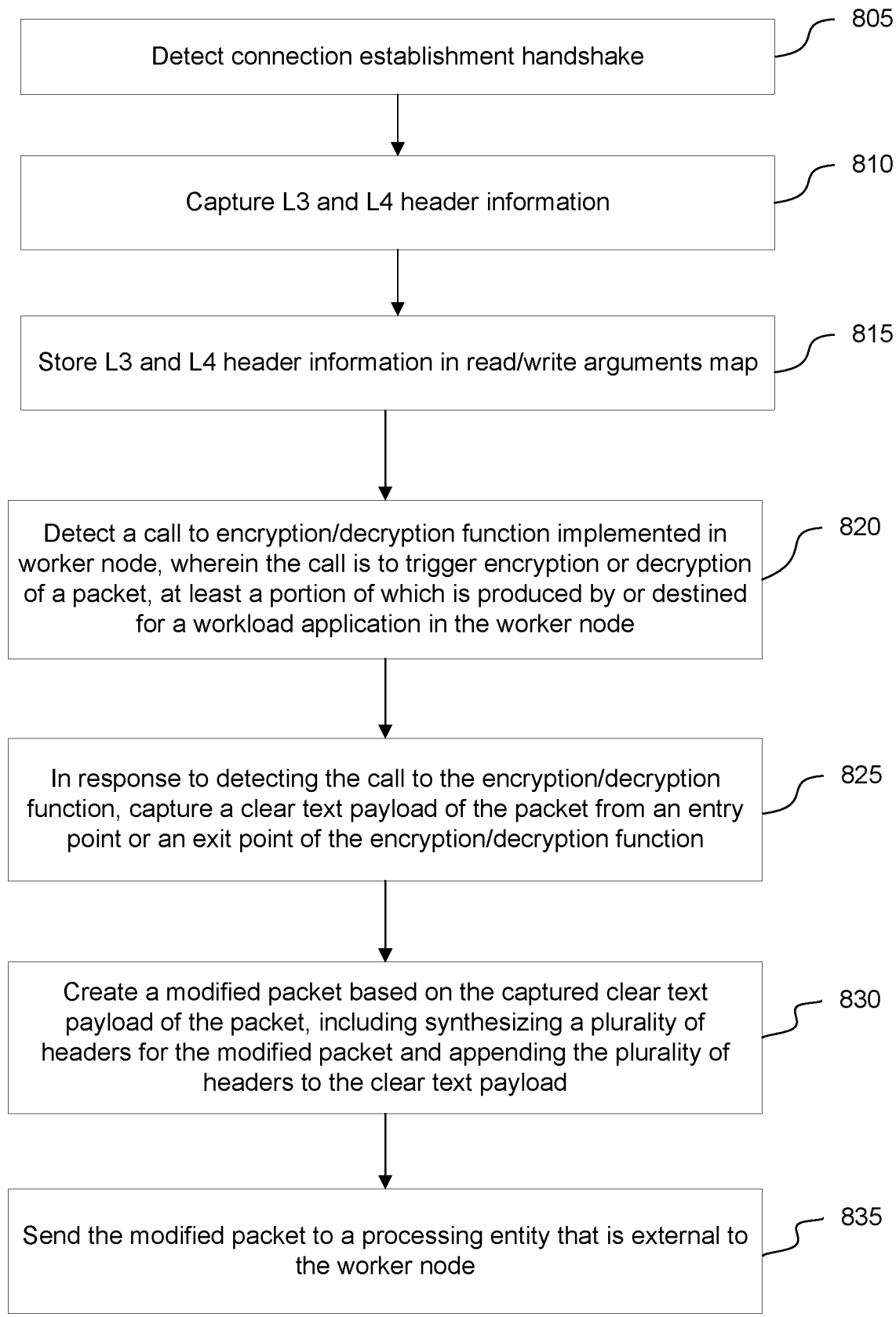
FIG. 8 is a flowchart illustrating an example of the runtime ECV process associated with a given worker node.

FIG. 8 is a flowchart of an example of the runtime ECV process associated with a given worker node. Initially, when the OS kernel 610 (FIG. 6) detects a handshake for establishing an encrypted connection (e.g., SSL_connect/SSL_accept messages) at step 805, the eBPF kernel 622 responds by capturing the L3 and L4 header information of the handshake messages at step 810, which may be done by using an eBPF Kprobe, for example. The eBPF kernel 622 then associates that header information with the connection pointer (e.g., SSL pointer) in a read/write arguments map at step 815. The purpose of the read/write arguments map is to provide a way to store and access (via the connection pointer) the clear-text data before the data is encrypted or after the data is decrypted. The connection pointer may be obtained via SSL_connect( )/SSL_accept( ) hooks, for example.

At step 820, the ECV host 601 detects a call to an encryption/decryption function implemented in its associated worker node. The call is to trigger encryption or decryption of a packet, at least a portion of which is produced by or destined for a workload application in the worker node. The call may be detected via an eBPF uprobe hook, for example. At step 825, in response to detecting the call, the process captures a clear text payload of the packet from the entry point or the exit point of the encryption/decryption function. In the case where the call is to an encryption function, the clear text payload is captured from the entry point of the function. In the case where the call is to a decryption function, the clear text payload is captured from the exit point of the function.

The ECV host 601 runs a polling thread that polls on an eBPF perf event. In response to the polling thread detecting a perf event, the ECV host 601 generates and sends the modified packet. Hence, at step 830, the process of FIG. 8 creates a modified packet based on the captured clear text payload of the packet. Step 830 includes synthesizing a plurality of headers for the modified packet and appending the plurality of headers to the clear text payload, as described above. Optionally, the ECV host 601 also generates and appends a VxLAN or L2GRE header. At step 835, the process sends the modified packet to a processing entity that is external to the worker node, such as the TVN 501 and/or an associated tool 512.

Figure 9:
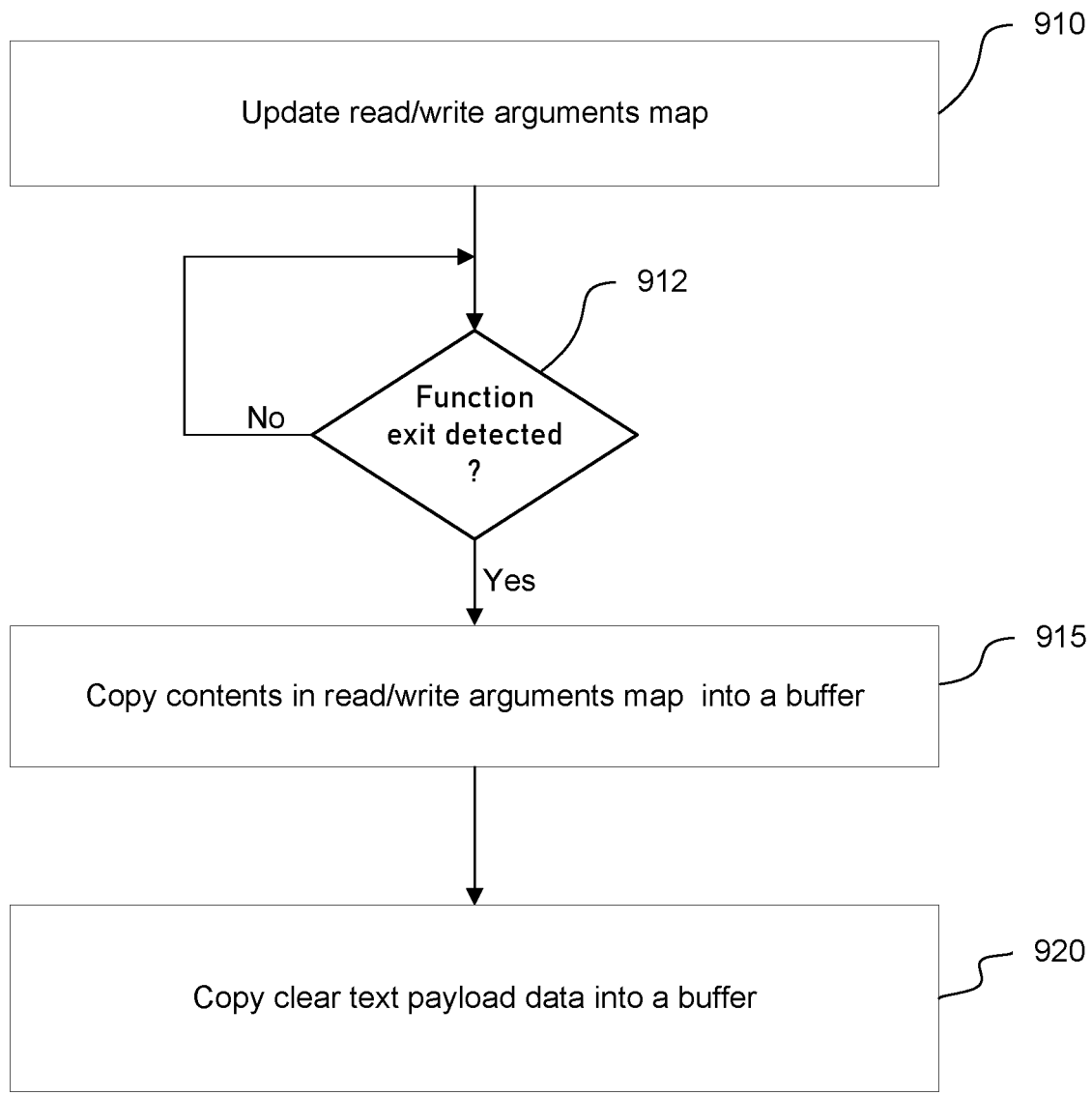
FIG. 9 is a flowchart illustrating in greater detail an example of the step of capturing clear text payload data.

FIG. 9 illustrates in greater detail the step 825 of capturing the clear text payload data, according to some embodiments. In at least some embodiments the process of step 825 is performed by the ECV host 601. When the ECV host 601 receives a call to the encryption/decryption function, step 815 includes, first, updating the read/write arguments map at step 910. Then, upon detecting an exit from the function (via another eBPF uprobe hook, for example) (step 912), at step 915 the process copies the clear-text data stored in the read/write map along with the SSL pointer and process information to a buffer, which may be a perf buffer. The size of the buffer may be configurable, where the size may be tuned to the memory available to the host system or virtual machine, in an effort to optimize performance. This configurability allows the solution to handle clear text of essentially any size. At step 920 the process submits the data in the buffer to a user space ECV application, which may be implemented by or a part of the ECV host 601.

Correlation of Clear-Text and Encrypted Traffic

Some external devices (e.g., tools 516) may require the original encrypted traffic to be provided with the clear text payloads. In at least some embodiments, therefore, the ECV host 601 can correlate clear text traffic with the corresponding encrypted traffic based on either flow or client and server random numbers at the tool. To do so, the ECV host 601 captures client and server random numbers from the SSL Client-Hello and Server-Hello messages, and captures five-tuple information (source IP address, source port, destination IP address, destination port, transport protocol), between the client and server. The ECV host 601 saves these items as correlation metadata and uses them to correlate the captured clear text payloads with the corresponding encrypted packets.

Service ID/Translation

In some embodiments, the ECV host 601 performs service identification/translation. In a containerized environment, such as Kubernetes, IP addresses are ephemeral, i.e., they only have meaning within the containerized cluster; yet the TVN 502 and tools 512 are typically not part of the containerized cluster. Consequently, in most (if not all) cases the IP addresses of packets captured by the ECV host 601 ordinarily could not be mapped to a service or application in any meaningful way. However, the ECV host 601 can intelligently map these ephemeral/internal IP addresses to services or applications they refer to by doing service translation. The service translation can be based on, for example, one or more Kubernetes (or other environment) Resources. For example, a Kubernetes Service Name can map to an application that can run in multiple pods, and an external/global IP address can be mapped to that Service Name. The Service Name, therefore, can be used to determine an external or global IP address, which can then be used to rewrite the IP header information to the external/global IP address when creating a modified packet as described above. This translation allows components (e.g., TVN 502 and/or tools 512) running outside of the containerized environment to easily map the external/global address as it sees fit. Additionally, which Resource or a set of Resources should be used for service translation can be selectable and can be changed at any time, while normal data traffic is being communicated.

Advanced Orchestration and Configuration

In at least some embodiments the ECV technique also includes the capability to have multiple destinations for receiving clear traffic. Based on applications or services to which ECV is being applied, the ECV host 601 can dynamically determine which library's path should be used for placing the software hooks. The ECV technique is agnostic to the underlying container run-time environment for this determination. The ECV technique further may include the capability to be very selective in which traffic should be captured in the clear. This could be based upon application, services and/or any other criteria the user prefers, in addition to or instead of the traditional L2, L3 and L4 fields.

ECV High-Availability (ECV-HA)

The ECV technique can also be applied so as to provide ECV high-availability (ECV-HA). SSL clear text, once captured, can be securely transmitted over separate connections (e.g., SSL/TSL connections) from the ECV host 601 to each of one or more TVNs and/or tools (collectively called "ECV receivers"). However, if any ECV receiver goes offline and subsequently comes back online, the corresponding connection will need to be restored. During this recovery process, monitored data captured by the ECV host 601 may be lost. To prevent such loss, a load balancer can be added between the ECV host 601 and the ECV receivers. This addition would provide high availability for the ECV receivers and secure the transmission of monitoring data. A separate connection can be established between each ECV host 601 and the load balancer.

Dynamic Updating of Encryption/Decryption Libraries

In at least some embodiments, the ECV technique supports dynamic updating of encryption/decryption libraries (e.g., OpenSSL libraries). In the event a new library is installed after the ECV is enabled, the TVMS 524 will be able to detect the new changes and signal the relevant ECV host 601 to dynamically add software hooks for the new library.

Flow Deduplication

A consequence of the ECV technique, in at least some embodiments, is that a TVN, such as TVN 502 in FIG. 5, will receive two copies of each encrypted flow being communicated between any two network nodes that employ the ECV technique (or more precisely, it will receive two copies of the unencrypted version of each flow). One copy of the flow, called the "transmit stream," will come to the TVN from the network node that is transmitting the flow to another network node, and another copy of the same flow, called the "receive stream," will come to the TVN from the other network node, which is receiving the flow. This duplication can result in doubling the workload of the TVN and/or any tools connected to it if the two copied of the flow received by the TVN are not deduplicated first. Introduced here, therefore, is a technique for flow deduplication at the TVN.

Conventional deduplication techniques look at each packet to determine whether it is a duplicate of another packet. That approach can be referred to as "packet-level" deduplication. In contrast with conventional deduplication techniques, the deduplication technique introduced here is performed at the flow level, not at the packet level. That is, although each packet is checked, with the technique introduced here no packet is checked to determine whether it is a duplicate of another packet. Instead, each packet is checked only to determine whether it belongs to a flow that is known to be a duplicate of another flow. Further, since the directionality of the packets is tracked in the deduplication technique introduced here, one copy of the flow can be retained by the TVN (i.e., the copy coming from one network node), and all packets belonging to the other copy of the flow (i.e., from the other network node) can be discarded. This approach is, therefore, referred to herein as "flow-level" deduplication.

A "flow" is defined herein as a set of packets being communicated between two network nodes in a particular direction within a specified period of time or session, where all the packets in the set of packets have the same source IP address, destination IP address, source port, destination port and protocol. Here, "direction" refers to the direction of communication between the two network nodes.

Figure 10:
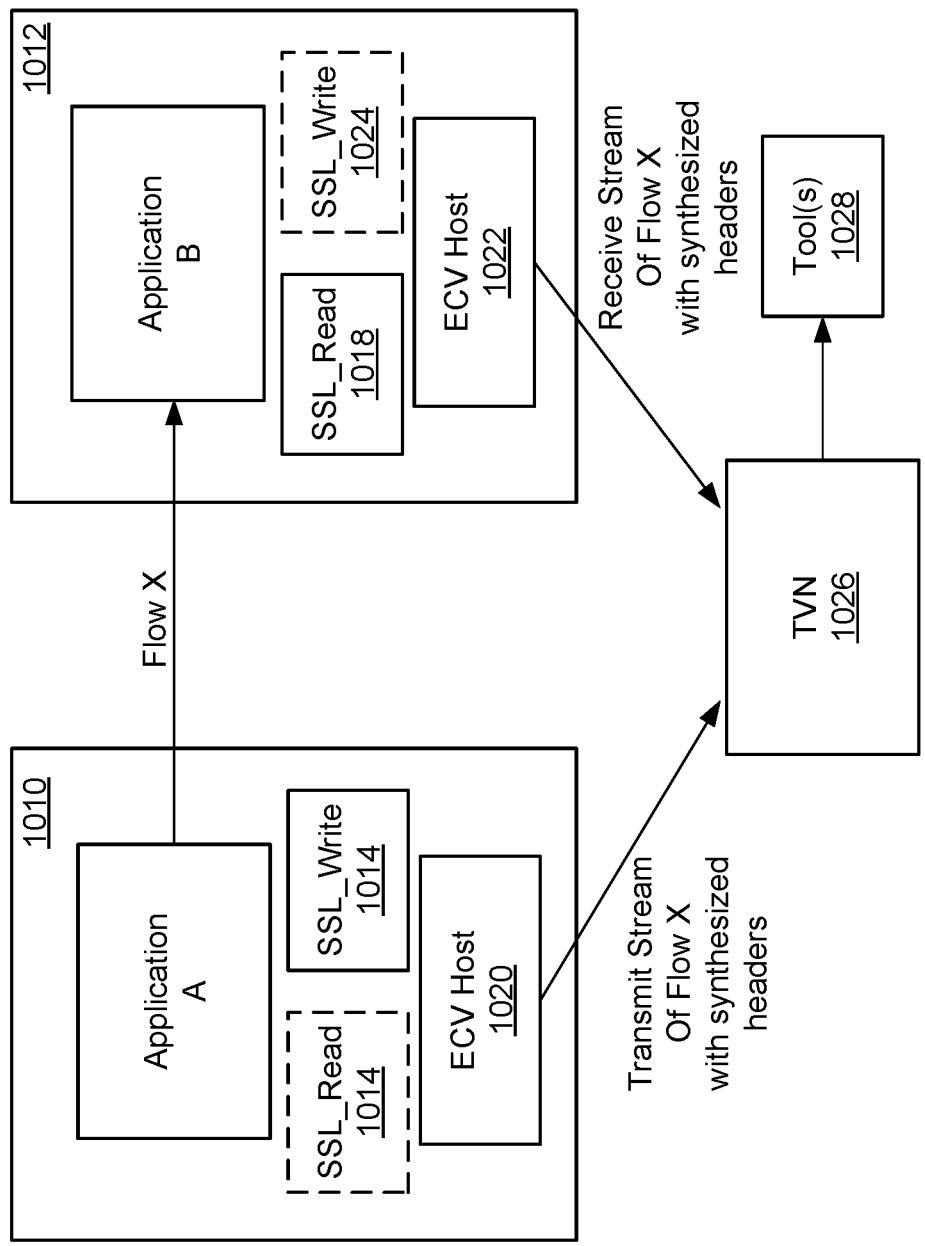
FIG. 10 illustrates an example of synthesized Read and Write streams being sent to a traffic visibility node (TVN) for a particular encrypted flow between two applications.

The flow deduplication technique will now be described further with reference to FIG. 10, which relates to a particular embodiment. In FIG. 10, there are two network and nodes that communicate with each other. One or both of the network nodes can be (but is not necessarily) a worker node such as described above. Network node 1010 includes a workload application, Application A, well network node 1012 includes a workload application, Application B. Network node 1010 further includes an SSL_Read Function 1014 and an SSL_Write function 1016, while network node 1012 includes an SSL_Read function 1018 and an SSL_Write function 1024. Network node 1010 further includes or is associated with an ECV host 1020, while network node 1012 includes or is associated with an ECV host 1022. ECV hosts 1020 and 1022 may have the same functionality and capabilities as ECV host 601 and may be implemented within a CT module such as CT 530, as described above.

To simplify explanation, FIG. 10 illustrates a scenario where data communication between the two network nodes is a single flow, Flow X, from Application A to Application B. It should be recognized, however, that the direction of communication could easily be the reverse, or the communication could be bidirectional (in which case there would be two flows). For Flow X, which is unidirectional from Application A to Application B, SSL_Read function 1014 in network node 1010 and SSL_Write function 1024 in network node 1012 are not needed, but are included in the figure for clarity. Hence, in network node 1010, the data received by ECV host 1020 from SSL_Write function 1016 is the plain text data from Application A that, after encryption, will be sent to Application B in network node 1012. Any data received by ECV host 1020 from SSL_Read function 1014 may be data received from Application B in network node 1012, after it has been decrypted, for delivery to Application A. The plain text data received by ECV host 1020 from SSL_Read function 1018 and SSL_Write function 1016 are turned into valid TCP streams by ECV host 1020, by synthesis of TCP headers, as described above, before being sent to the TVN 1026. TVN 1026 may have the same functionalities and capabilities as TVN 502 in FIG. 5, as described above. In a similar manner, the data to be received and transmitted by Application B are turned into valid TCP streams by ECV host 1022. Hence, the synthesized TCP streams at both network node 1010 and network node 1012 are sent to TVN 1026, to be forwarded to one or more tools 1028 for analysis.

Recall that a "flow" is directional in the context of this description. Therefore, for each flow between Application A and Application B, the TVN 1026 will receive two identical packet streams, each of which is a copy of the flow: a "Transmit stream" from the transmitting application and a "Receive stream" from the receiving application. Hence, the terms "stream" and "flow" are used interchangeably in this description. For a bidirectional communication session between two applications, there will be two flows, one in each direction, such that the TVN 1026 will receive both a Transmit stream and a Receive stream from each application involved in the session. For a given flow, such as Flow X in FIG. 10, the Receive stream received by TVN 1026 from Application B (via ECV host 1022) will be a duplicate of the corresponding Transmit stream received by TVN 1026 from Application A (via ECV host 1020). Similarly, the Receive stream received by TVN 1026 from Application A (if any) will be a duplicate of the corresponding Transmit stream received by TVN 1026 from Application B (if any).

The flow deduplication technique introduced here enables detection of the duplicate flows. Note that the synthesized TCP streams cannot guarantee identical packet sizes at Application A and Application B, as the data received and transmitted need not be the same chunks on both ends, because of the operating system and network considerations. Flow deduplication is different from packet deduplication as it applies to the entire flow, rather than to each packet in the case of packet deduplication. Flow deduplication addresses removal of duplicate data because of TCP synthesis, whereas packet deduplication addresses removal of duplicate packets that occur because of multiple taps or span ports.

For a TCP flow between Application A and Application B, assume that the IP address of Application A is IP-A, the IP address of Application B is IP-B, the TCP port at Application A is PORT-A, and the TCP port at Application B is PORT-B. Assume further that the TCP connection is initiated by Application A. A Direction bit can be added to or associated with each packet of each stream provided to the TVN 1026 as a directional indicator, to indicate whether the packet is being transmitted from Application A to Application B, or from Application B to Application A. For example, a value of 0 for the Direction bit can indicate the packet belongs to a flow from Application A to Application B, while a value of 1 for the Direction bit can indicate the packet belongs to a flow from Application B to Application A. In at least some embodiments, the Direction bit can also be considered to be a source indicator or source tag, since the direction of the data flow associated with any given packet corresponds to the source of the packet.

For each packet sent to the TVN 1026 from Application A or Application B, the Direction bit can be hashed with the packet's five-tuple, i.e., {source IP address, destination IP address, source port, destination port, protocol}, to produce a hash value. Any known or convenient hash function can be used for this purpose, such as SHA-256, in which case the hash function outputs a random 32-bit number. The output hash value is referred to herein as the Initial Sequence Number (ISN), and it will be identical for all packets belonging to the same flow. The ISNs therefore can be used by the TVN 1026 to deduplicate flows.

In some embodiments, the hash function is executed at the endpoints, for example by the ECV hosts 1020 and 1022, and the output hash value (ISN) is included in a synthesized TCP header and/or footer of each packet sent by ECV host 1020 or 1022 to the TVN 1026. In such embodiments, the TVN 1026 only needs to examine the ISN of each packet it receives for purposes of flow deduplication. In other embodiments, the Direction bit is added to a synthesized header or footer of each packet, and the hash function is executed by the TVN 1026 to determine the ISN for each packet.

Hence, assuming bidirectional communication between Application A and Application B, there are two TCP streams at Application A, a Transmit stream and Receive stream. The Application A Transmit Stream has the following values:
Source IP address IP-A
Destination IP address IP-B
Source Port PORT-A
Destination Port PORT-B
Protocol TCP
Direction 0 (Connection initiated at Application A, Transmit direction)
ISN Hash of (Source IP address, Destination IP address, Source Port, Destination Port, Protocol, Direction)

The Application A Receive Stream has the following values:
Source IP address IP-B
Destination IP address IP-A
Source Port PORT-B
Destination Port PORT-A
Protocol TCP
Direction 1 (Connection initiated at Application A, Receive direction)
ISN Hash of (Source IP address, Destination IP address, Source Port, Destination Port, Protocol, Direction)

Note that the only difference in these values between the Application A Transmit stream and the Application A Receive stream is in the Direction bit and the ISN (where the ISN is a function of the Direction bit and the five-tuple).

Similarly, still assuming the same bidirectional communication example, there are also two TCP streams at Application B, a Transmit stream and Receive stream. The Application B Transmit Stream has the following values:
Source IP address IP-B
Destination IP address IP-A
Source Port PORT-B
Destination Port PORT-A
Protocol TCP
Direction 0 (Connection initiated at Application B, Transmit direction)
ISN Hash of (Source IP address, Destination IP address, Source Port, Destination Port, Protocol, Direction)

The Application B Receive Stream has the following values:
Source IP address IP-A
Destination IP address IP-B
Source Port PORT-A
Destination Port PORT-B
Protocol TCP
Direction 1 (Connection initiated at Application A, Receive direction)
ISN Hash of (Source IP address, Destination IP address, Source Port, Destination Port, Protocol, Direction)

Note that the ISNs for the Application B Receive stream will be identical to the ISNs for the Application A Transmit stream, and the ISNs for the Application A Receive stream will be identical to the ISNs for the Application B Transmit stream. Consequently, the TVN 1026 can detect duplicate flows by looking for duplicate ISNs within a given time window. Once the duplicate flows are detected, all packets that are being communicated in a particular direction for the flow (as indicated by the Direction bit) can be kept while all packets being communicated in the other direction for the flow can be dropped. As a result, only one set of packets for the flow are delivered to the tool(s) 1028, thus achieving flow deduplication.

The use of a Direction bit as described above assumes that the operator of the TVN 1026 has the ability to control the source nodes (e.g., network nodes 1010 and 1012), or at least has the ability to cause a Direction bit to be added to each packet sent by a source node. However, in some implementations that may not be possible, i.e., the operator of the TVN 1026 may have no control over source nodes. Accordingly, in embodiments where packets sent from the source nodes do not contain a Direction bit or some other express indicator that is equivalent to it in function, duplicate flows can still be identified, by the TVN reconstructing the original source data stream from received packets coming from multiple sources. For example, the TVN 1026 can compare data in packets that have the same sequence identifier, within a sliding time window, to identify duplicate data. The sliding time window can be large enough to encompass multiple consecutive packets from any given source, or it may be small enough to encompass only a portion of the data payload of a given packet; or it may be variable in length/duration.

Figure 11:
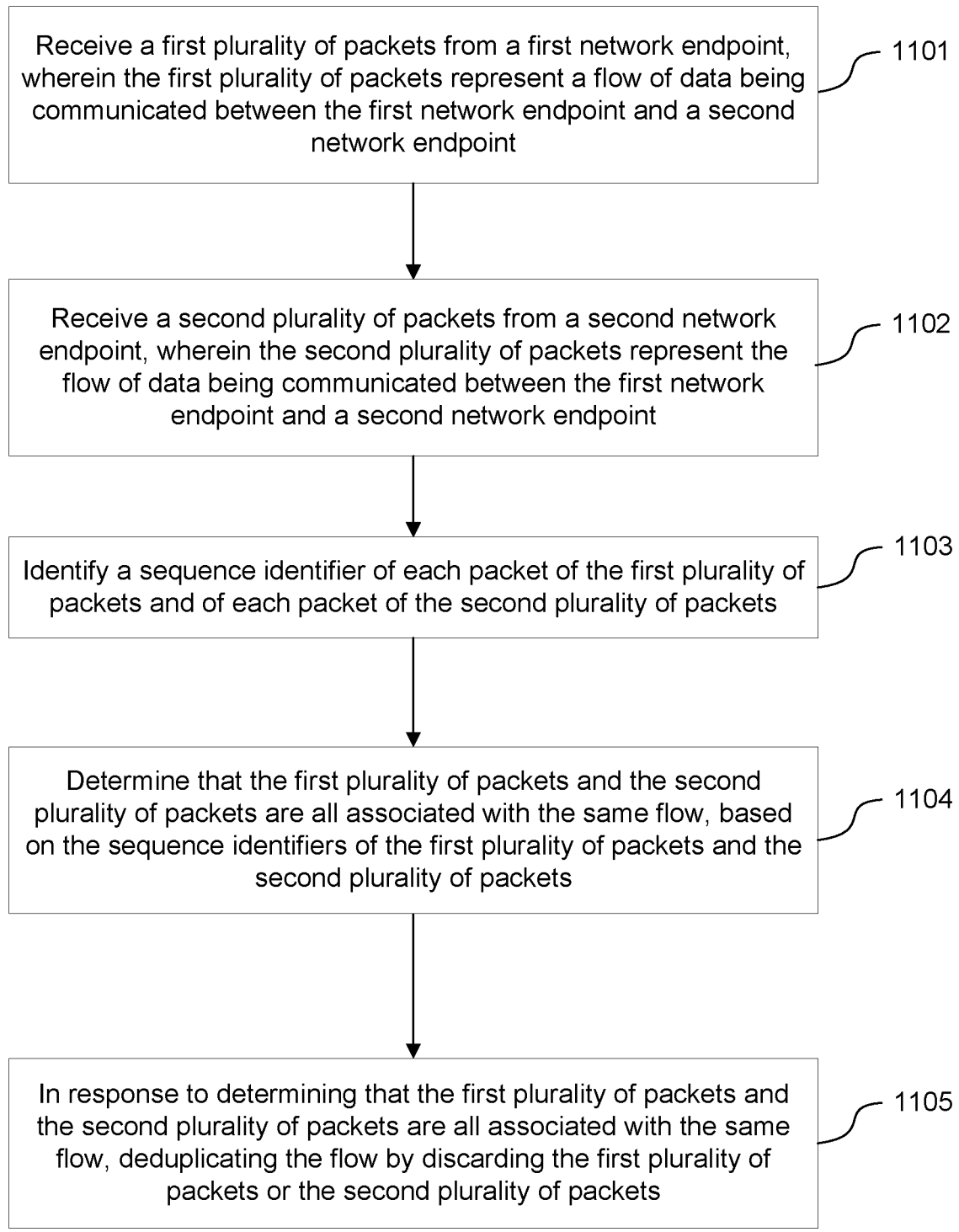
FIG. 11 is a flow diagram illustrating an example of a process of flow deduplication.

FIG. 11 is a flow diagram illustrating an example of the process for flow deduplication, in at least some embodiments. In at least some embodiments, the process is performed by a TVN, such as TVN 1026. At step 1101, the process receives a first plurality of packets from a first network endpoint. The first plurality of packets represent a flow of data being communicated between the first network endpoint and a second network endpoint. The first plurality of packets can be a transmit stream or receive stream with synthesized headers, from an ECV host in or associated with the first network endpoint. At step 1102, the process receives a second plurality of packets from a second network endpoint. The second plurality of packets represent the same flow as mentioned in step 1101, i.e., the flow of data being communicated between the first network endpoint and the second network endpoint. For example, if the first plurality of packets are a transmit stream from the first network endpoint, then the second plurality of packets may be the corresponding receive stream from the second network endpoint. Note that at least steps 1101 and 1102 in this process can be performed substantially concurrently. At step 1103 the process identifies a sequence identifier of each packet of the first plurality of packets and of each packet of the second plurality of packets. The sequence identifier may be an ISN such as described above. The sequence identifier may be contained in the packet, or it may be generated by the TVN based on information provided in the packet (e.g., in packet headers and/or footers). At step 1104 the process determines that the first plurality of packets and the second plurality of packets are all associated with the same flow, based on the sequence identifiers of the first plurality of packets and the second plurality of packets matching. At step 1105, in response to determining that the first plurality of packets and the second plurality of packets are all associated with the same flow, the process deduplicates the flow by discarding either the first plurality of packets or the second plurality of packets. The process can be performed in real time as the packets are received. Alternatively, some or all of the packets can be buffered by the TVN, and deduplicated in batch mode.

Example Physical Implementation

Figure 12:
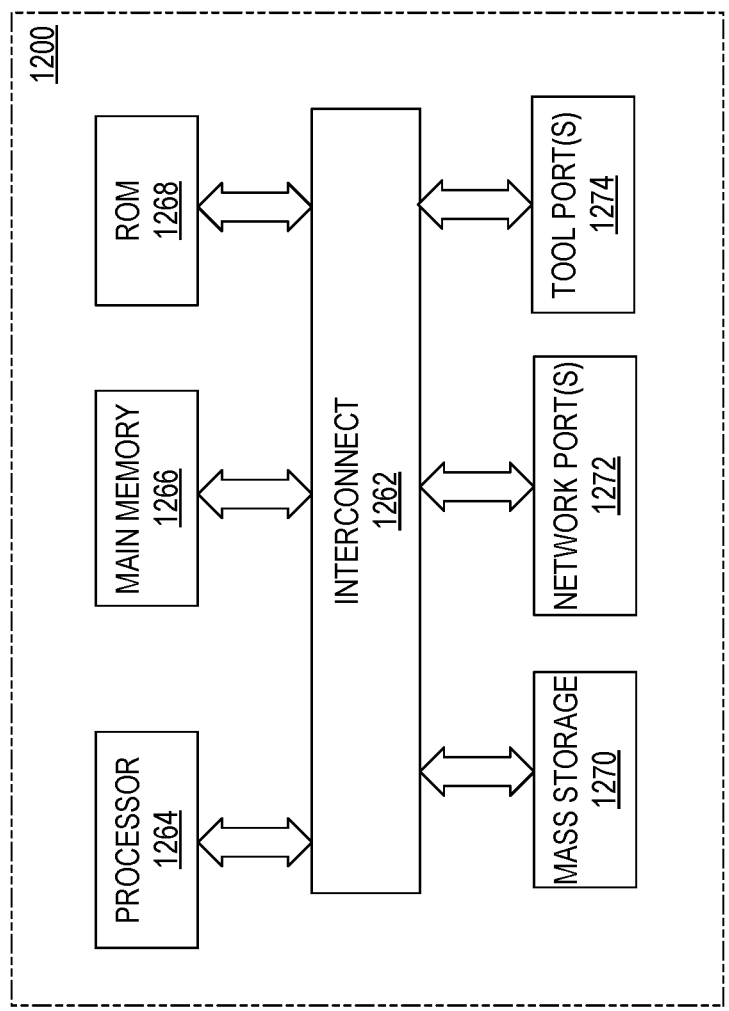
FIG. 12 is a block diagram of significant components of a processing system, representing a physical platform that can implement one or more of the components described herein.

FIG. 12 is a block diagram showing at least some of the significant components of a processing system 1200, representing a physical platform that can implement any one or more of: a worker node (or multiple worker nodes) 516, TVMS 524, TVN 502, tool 512 and/or other elements of a containerized environment. As shown, processing system 1200 includes an interconnect 1262 or other communication mechanism for communicating information, and at least one processor 1264 coupled with the interconnect 1262 for processing information. The interconnect 1262 may be or include, for example, one or more buses, adapters, point-to-point connections, or a combination thereof.

The processor 1264 may be used to perform various functions described above. For example, in some embodiments the processor 1264 may perform and/or trigger encryption and decryption operations, inspect packet headers, generate, store and compare hash values/session IDs, etc. The processor 1264 can be implemented as programmable circuitry programmed/configured by software and/or firmware, or as special-purpose (hardwired) circuitry, or by a combination thereof. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

The processing system 1200 also includes a main memory 1266, such as a random access memory (RAM) or other dynamic storage device, coupled to the interconnect 1262 for storing information and instructions to be executed by the processor 1264. The main memory 1266 also may be used for storing temporary variables or other intermediate information during execution of instructions to be executed by the processor 1264. The processing system 1200 further includes a read only memory (ROM) 1268 or other static storage device coupled to the interconnect 1262 for storing static information and instructions for the processor 1264. A mass storage device 1270, such as a magnetic, solid-state or optical disk, is coupled to the interconnect 1262 for storing information and instructions. The processing system 1200 further includes one or more physical network ports 1272 coupled to the interconnect 1262, through which the processing system 1200 can communicate over one or more networks with one or more external devices. At least in a case where processing system 1200 is a TVN, processing system 1200 further includes one or more physical tool ports 1274 coupled to the interconnect 1262, through which the processing system 1200 can communicate with a corresponding one or more tools.

The processing system 1200 may be used for performing various functions described above. According to one embodiment, such use is provided by system 1200 in response to processor 1264 executing one or more sequences of one or more instructions contained in the main memory 1266. Such instructions may be read into the main memory 1266 from another computer-readable medium, such as storage device 1270. Execution of the sequences of instructions contained in the main memory 1266 causes the processor 1264 to perform the process steps described herein. One or more processors in a multi-processing arrangement may also be employed to execute the sequences of instructions contained in the main memory 1266. In alternative embodiments, hard-wired circuitry may be used in place of or in combination with software instructions to implement features of the embodiments described herein. Thus, embodiments described herein are not limited to any specific combination of hardware circuitry and software.

Unless contrary to physical possibility, it is envisioned that (i) the methods/steps described herein may be performed in any sequence and/or in any combination, and that (ii) the components of respective embodiments may be combined in any manner.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, tablet computer, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   receiving, by a traffic visibility node, a first plurality of packets from a first network endpoint, wherein the first plurality of packets represents a flow of data being communicated between the first network endpoint and a second network endpoint;
   receiving, by the traffic visibility node, a second plurality of packets from the second network endpoint;
   identifying, by the traffic visibility node, a sequence identifier of each packet of the first plurality of packets and of each packet of the second plurality of packets;
   determining, by the traffic visibility node, that the first plurality of packets and the second plurality of packets are all associated with the same flow, based on the sequence identifiers of the first plurality of packets and the second plurality of packets, wherein the determining that the first plurality of packets and the second plurality of packets are all associated with the same flow comprises:
      determining that the sequence identifiers of all of the first plurality of packets and the second plurality of packets are identical; and
   reconstructing at least a portion of the flow at the traffic visibility node, by comparing at least a portion of data in the first plurality of packets with at least a portion of data in the second plurality of packets, within a sliding window; and
   in response to determining that the first plurality of packets and the second plurality of packets are all associated with the same flow, deduplicating the flow, by the traffic visibility node, by discarding at least a portion of the first plurality of packets or at least a portion of the second plurality of packets.

2. The method of claim 1, wherein determining that the first plurality of packets and the second plurality of packets are all associated with the same flow comprises determining that the sequence identifiers of all of the first plurality of packets and the second plurality of packets are identical.

3. The method of claim 1, wherein for each packet of the first plurality of packets and the second plurality of packets, the sequence identifier of the packet comprises a hash of a five-tuple and a directional indicator, the directional indicator being indicative of a communication direction of the packet.

4. The method of claim 1, wherein for each packet of the first plurality of packets and the second plurality of packets, the sequence identifier of the packet comprises a hash of header information from the packet, including source IP address, destination IP address, source port, destination port, protocol and a directional indicator, the directional indicator being indicative of a communication direction of the packet.

5. The method of claim 1, wherein the first plurality of packets is at least a portion of an SSL Read stream or an SSL Write stream synthesized at the first network endpoint.

6. The method of claim 1, wherein the first plurality of packets and the second plurality of packets are each at least a portion of an SSL Read stream or an SSL Write stream synthesized at the first network endpoint or the second network endpoint.

7. The method of claim 1, wherein:
   the first plurality of packets and the second plurality of packets correspond to a flow of data being transmitted from the first network endpoint to the second network endpoint;
   the first plurality of packets is at least a portion of a synthesized SSL Write stream from the first network endpoint, corresponding to the flow of data being transmitted from the first network endpoint to the second network endpoint; and
   the second plurality of packets is at least a portion of a synthesized SSL Read stream from the second network endpoint, corresponding to the flow of data being transmitted from the first network endpoint to the second network endpoint.

8. The method of claim 1, wherein:
   the first plurality of packets and the second plurality of packets correspond to a flow of data being transmitted from the second network endpoint to the first network endpoint;
   the first plurality of packets is at least a portion of a synthesized SSL Read stream from the first network endpoint, corresponding to the flow of data being transmitted from the second network endpoint and to the first network endpoint; and
   the second plurality of packets is at least a portion of a synthesized SSL Write stream from the second network endpoint, corresponding to the flow of data being transmitted from the first network endpoint and to second network endpoint.

9. The method of claim 1, wherein the deduplicating the flow results in a deduplicated flow, the method further comprising:
   forwarding, by the traffic visibility node, at least a payload of a packet of the deduplicated flow to an external tool coupled to the traffic visibility node, for analysis.

10. The method of claim 1, wherein:
    for each packet of the first plurality of packets and the second plurality of packets, the sequence identifier of the packet comprises a hash of header information from the packet, including source IP address, destination IP address, source port, destination port, protocol and a directional indicator, the directional indicator being indicative of a communication direction of the packet;

the first plurality of packets and the second plurality of packets are each at least a portion of an SSL Read stream or an SSL Write stream synthesized at the first network endpoint or the second network endpoint;

determining that the first plurality of packets and the second plurality of packets are all associated with the same flow comprises determining that the sequence identifiers of all of the first plurality of packets and the second plurality of packets are identical; and deduplicating the flow results in a deduplicated flow; the method further comprising:

forwarding, by the traffic visibility node, at least a payload of a packet of the deduplicated flow to an external tool coupled to the traffic visibility node, for analysis.

11. At least one machine-readable storage medium having instructions stored thereon, execution of which by at least one processor causes performance of operations comprising:

receiving, by a network node, a first plurality of packets from a first network endpoint that is external to the network node, wherein the first plurality of packets represents a flow of data being communicated between the first network endpoint and a second network endpoint that is external to the network node;

receiving, by the network node, a second plurality of packets from the second network endpoint;

identifying, by the network node, a sequence identifier of each packet of the first plurality of packets and of each packet of the second plurality of packets;

determining, by the network node, that the first plurality of packets and the second plurality of packets are all associated with the same flow, based on the sequence identifiers of the first plurality of packets and the second plurality of packets, wherein the determining that the first plurality of packets and the second plurality of packets are all associated with the same flow comprises:

determining that the sequence identifiers of all of the first plurality of packets and the second plurality of packets are identical; and reconstructing at least a portion of the flow at the network node, by comparing at least a portion of data in the first plurality of packets with at least a portion of data in the second plurality of packets, within a sliding window; and in response to determining that the first plurality of packets and the second plurality of packets are all associated with the same flow, deduplicating the flow, by the network node, by discarding at least a portion of the first plurality of packets or at least a portion of the second plurality of packets, wherein deduplicating the flow results in a deduplicated flow.

12. The at least one machine-readable storage medium of claim 11, wherein determining that the first plurality of packets and the second plurality of packets are all associated with the same flow comprises determining that the sequence identifiers of all of the first plurality of packets and the second plurality of packets are identical.

13. The at least one machine-readable storage medium of claim 11, wherein for each packet of the first plurality of packets and the second plurality of packets, the sequence identifier of the packet comprises a hash of a five-tuple and a directional indicator, the directional indicator being indicative of a communication direction of the packet.

14. The at least one machine-readable storage medium of claim 11, wherein for each packet of the first plurality of packets and the second plurality of packets, the sequence identifier of the packet comprises a hash of header information from the packet, including source IP address, destination IP address, source port, destination port, protocol and a directional indicator, the directional indicator being indicative of a communication direction of the packet.

15. The at least one machine-readable storage medium of claim 11, wherein the first plurality of packets is at least a portion of an SSL Read stream or an SSL Write stream synthesized at the first network endpoint.

16. A processing system comprising:
a memory;
a network interface; and
at least one processor coupled to the memory and the network interface and configured to enable the processing system to perform operations comprising:
receiving a first plurality of packets from a first network endpoint, wherein the first plurality of packets represents a flow of data being communicated between the first network endpoint and a second network endpoint;
receiving a second plurality of packets from the second network endpoint;
identifying a sequence identifier of each packet of the first plurality of packets and of each packet of the second plurality of packets;
determining that the first plurality of packets and the second plurality of packets are all associated with the same flow, based on the sequence identifiers of the first plurality of packets and the second plurality of packets, wherein the determining that the first plurality of packets and the second plurality of packets are all associated with the same flow comprises:
determining that the sequence identifiers of all of the first plurality of packets and the second plurality of packets are identical; and
reconstructing at least a portion of the flow, by comparing at least a portion of data in the first plurality of packets with at least a portion of data in the second plurality of packets, within a sliding window; and
in response to determining that the first plurality of packets and the second plurality of packets are all associated with the same flow, deduplicating the flow by discarding at least a portion of the first plurality of packets or at least a portion of the second plurality of packets, wherein deduplicating the flow results in a deduplicated flow; and
forwarding at least a payload of a packet of the deduplicated flow to a tool for analysis.

17. The processing system of claim 16, wherein determining that the first plurality of packets and the second plurality of packets are all associated with the same flow comprises determining that the sequence identifiers of all of the first plurality of packets and the second plurality of packets are identical, wherein for each packet of the first plurality of packets and the second plurality of packets, the sequence identifier of the packet comprises a hash of a five-tuple and a directional indicator, the directional indicator being indicative of a communication direction of the packet.

18. The processing system of claim 16, wherein the first plurality of packets is at least a portion of an SSL Read stream or an SSL Write stream synthesized at the first network endpoint.

* * * * *